(12) United States Patent
Yamaoka

(10) Patent No.: US 9,089,769 B2
(45) Date of Patent: Jul. 28, 2015

(54) GAME DEVICE, COMPUTER-READABLE RECORDING MEDIUM, AND GAME CONTROL METHOD

(75) Inventor: Masatoshi Yamaoka, Osaka (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 274 days.

(21) Appl. No.: 13/816,818

(22) PCT Filed: Dec. 26, 2011

(86) PCT No.: PCT/JP2011/007261
§ 371 (c)(1),
(2), (4) Date: Feb. 13, 2013

(87) PCT Pub. No.: WO2012/114418
PCT Pub. Date: Aug. 30, 2012

(65) Prior Publication Data
US 2013/0143653 A1    Jun. 6, 2013

(30) Foreign Application Priority Data

Feb. 25, 2011    (JP) .................................. 2011-039753

(51) Int. Cl.
*A63F 9/24* (2006.01)
*A63F 13/00* (2014.01)
(Continued)

(52) U.S. Cl.
CPC ................. *A63F 13/06* (2013.01); *A63F 13/10* (2013.01); *A63F 2300/1075* (2013.01); *A63F 2300/308* (2013.01); *A63F 2300/646* (2013.01); *A63F 2300/8011* (2013.01)

(58) Field of Classification Search
CPC .................... A63F 2300/10; A63F 2300/1068; A63F 2300/1075; A63F 2300/204; A63F 2300/6045; A63F 2300/6054; A63F 2300/63; A63F 2300/638; A63F 2300/8011; A63F 13/02; A63F 13/20; A63F 13/21; A63F 13/214; A63F 13/2145; A63F 13/23; A63F 13/24; A63F 13/245; A63F 13/40; A63F 13/42; A63F 13/44; A63F 13/80; A63F 13/812; A63F 13/92; A63F 2300/00; A63F 2300/308; A63F 2300/646; A63F 13/06; A63F 13/10

USPC .................................. 463/2–4, 30–33, 36–43
See application file for complete search history.

(56) References Cited

U.S. PATENT DOCUMENTS

| 2003/0022707 | A1* | 1/2003 | Namba et al. ..................... 463/3 |
| 2005/0159217 | A1 | 7/2005 | Tawara |

(Continued)

FOREIGN PATENT DOCUMENTS

| JP | 2006-129942 | 5/2006 |
| JP | 3822215 | 9/2006 |

(Continued)

OTHER PUBLICATIONS

Office Action issued May 9, 2014 in corresponding Korean Application No. 10-2013-7003747, with English Summary.

(Continued)

*Primary Examiner* — Milap Shah
(74) *Attorney, Agent, or Firm* — Wenderoth, Lind & Ponack, L.L.P.

(57) ABSTRACT

An aiming cursor display unit 221 displays, in an aiming cursor display region DM1 on a display unit 211, an aiming cursor for determining a position where an action is to be applied to a ball object BL in a game space. A manipulation icon display unit 222 displays a manipulation icon CM for manipulating an aiming cursor K in a manipulation icon display region DM2 that is separate from the aiming cursor display region DM1 on the display unit 211. An aiming cursor linking control unit 224 moves and displays the aiming cursor K in the display unit 211 such that the aiming cursor K is linked with a movement of the manipulation icon CM that is moved and displayed by the manipulation icon display unit 222.

7 Claims, 12 Drawing Sheets

(51) Int. Cl.
*A63F 13/20* (2014.01)
*A63F 13/40* (2014.01)

(56) References Cited

U.S. PATENT DOCUMENTS

| | | | |
|---|---|---|---|
| 2005/0176502 A1* | 8/2005 | Nishimura et al. | 463/31 |
| 2005/0215323 A1* | 9/2005 | Miyamoto et al. | 463/43 |
| 2006/0116203 A1* | 6/2006 | Nakada et al. | 463/30 |
| 2006/0128468 A1* | 6/2006 | Yoshikawa et al. | 463/36 |
| 2006/0252540 A1* | 11/2006 | Kando et al. | 463/36 |
| 2007/0032280 A1* | 2/2007 | Itskov et al. | 463/7 |
| 2007/0155453 A1* | 7/2007 | Fujioka et al. | 463/2 |
| 2007/0155457 A1* | 7/2007 | Fujioka et al. | 463/3 |
| 2007/0197284 A1 | 8/2007 | Fujioka et al. | |
| 2008/0200223 A1 | 8/2008 | Maeda et al. | |
| 2009/0088204 A1 | 4/2009 | Culbert et al. | |
| 2009/0170579 A1* | 7/2009 | Ishii et al. | 463/2 |
| 2010/0177051 A1* | 7/2010 | Bilow | 345/173 |
| 2010/0222143 A1* | 9/2010 | Endo | 463/30 |
| 2010/0315352 A1 | 12/2010 | Hamamura et al. | |
| 2011/0130182 A1* | 6/2011 | Namba et al. | 463/3 |
| 2012/0083337 A1* | 4/2012 | Nanba et al. | 463/31 |
| 2012/0184368 A1* | 7/2012 | Yamaoka | 463/31 |
| 2012/0309478 A1* | 12/2012 | Kotsugai et al. | 463/3 |
| 2013/0084980 A1* | 4/2013 | Hammontree et al. | 463/36 |

FOREIGN PATENT DOCUMENTS

| | | |
|---|---|---|
| JP | 3892889 | 3/2007 |
| JP | 2008-155064 | 7/2008 |
| JP | 2008-210126 | 9/2008 |
| JP | 2010-88642 | 4/2010 |
| JP | 2010-233832 | 10/2010 |
| JP | 2011-167 | 1/2011 |
| JP | 2011-24856 | 2/2011 |
| KR | 10-2010-0083807 | 7/2010 |

OTHER PUBLICATIONS

International Search Report issued Mar. 13, 2012 in International (PCT) Application No. PCT/JP2011/007261.

Japanese Office Action issued Jan. 15, 2013 in Japanese Application No. 2012-214213.

* cited by examiner

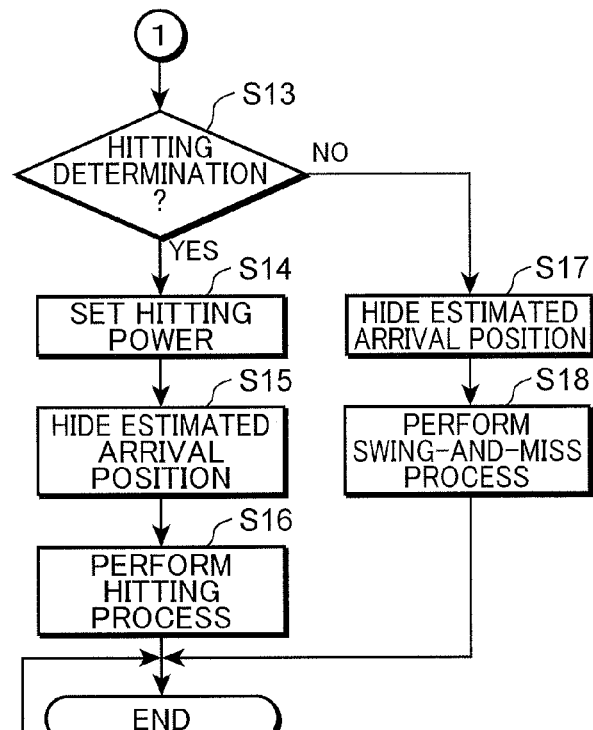
FIG.3
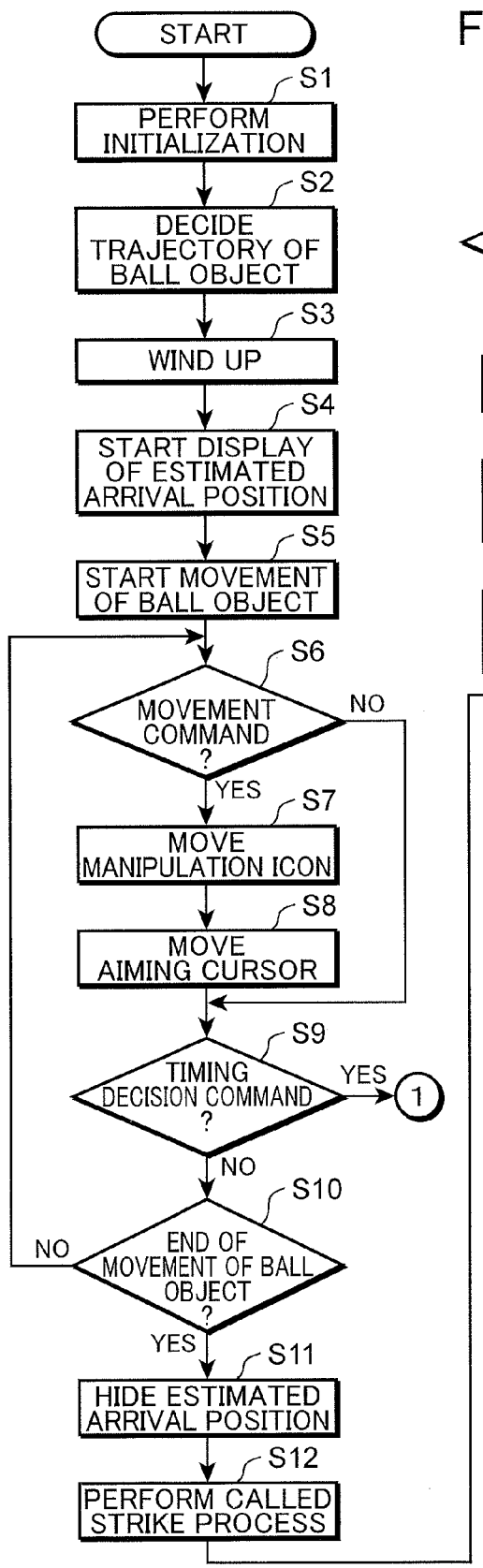

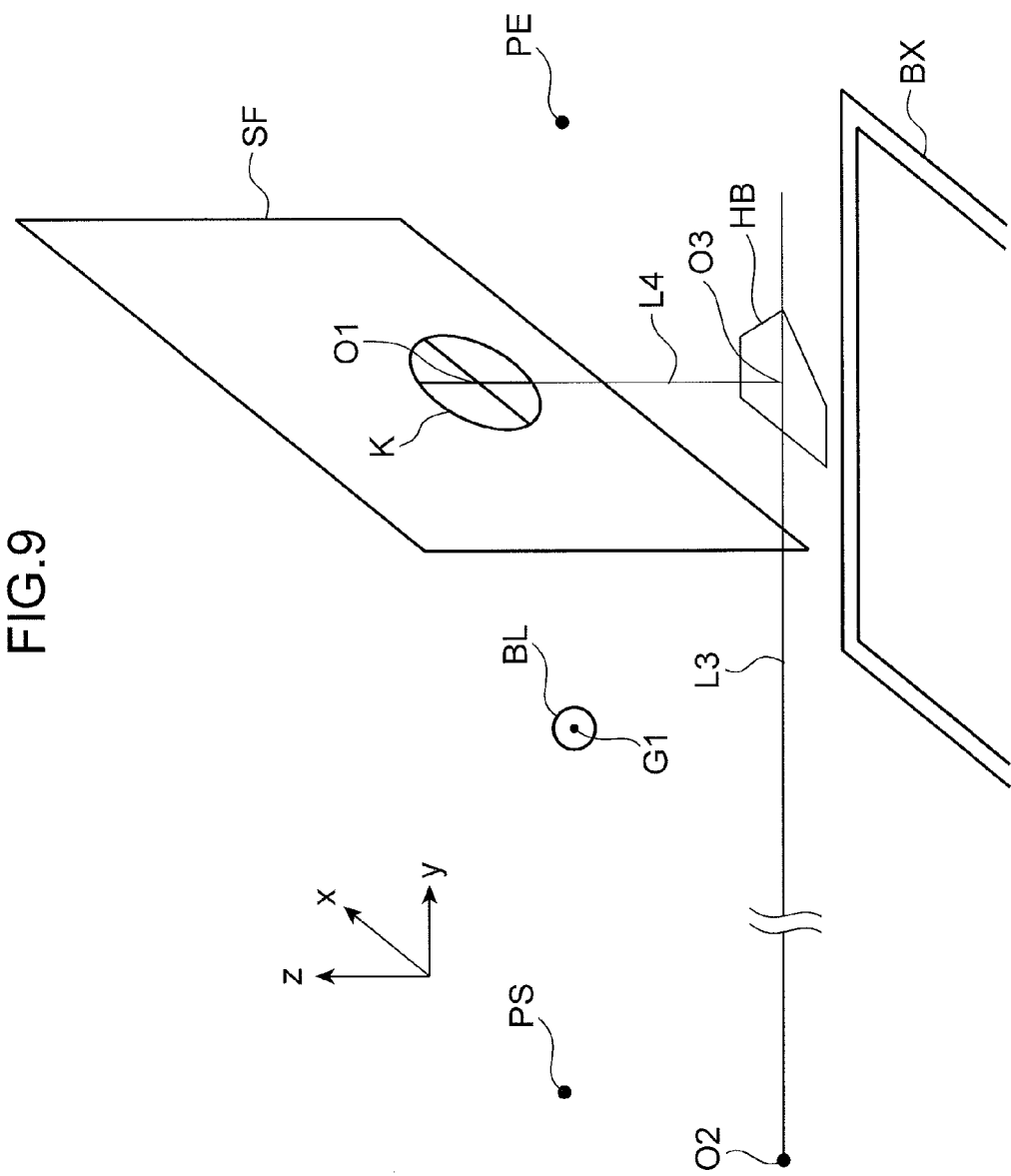

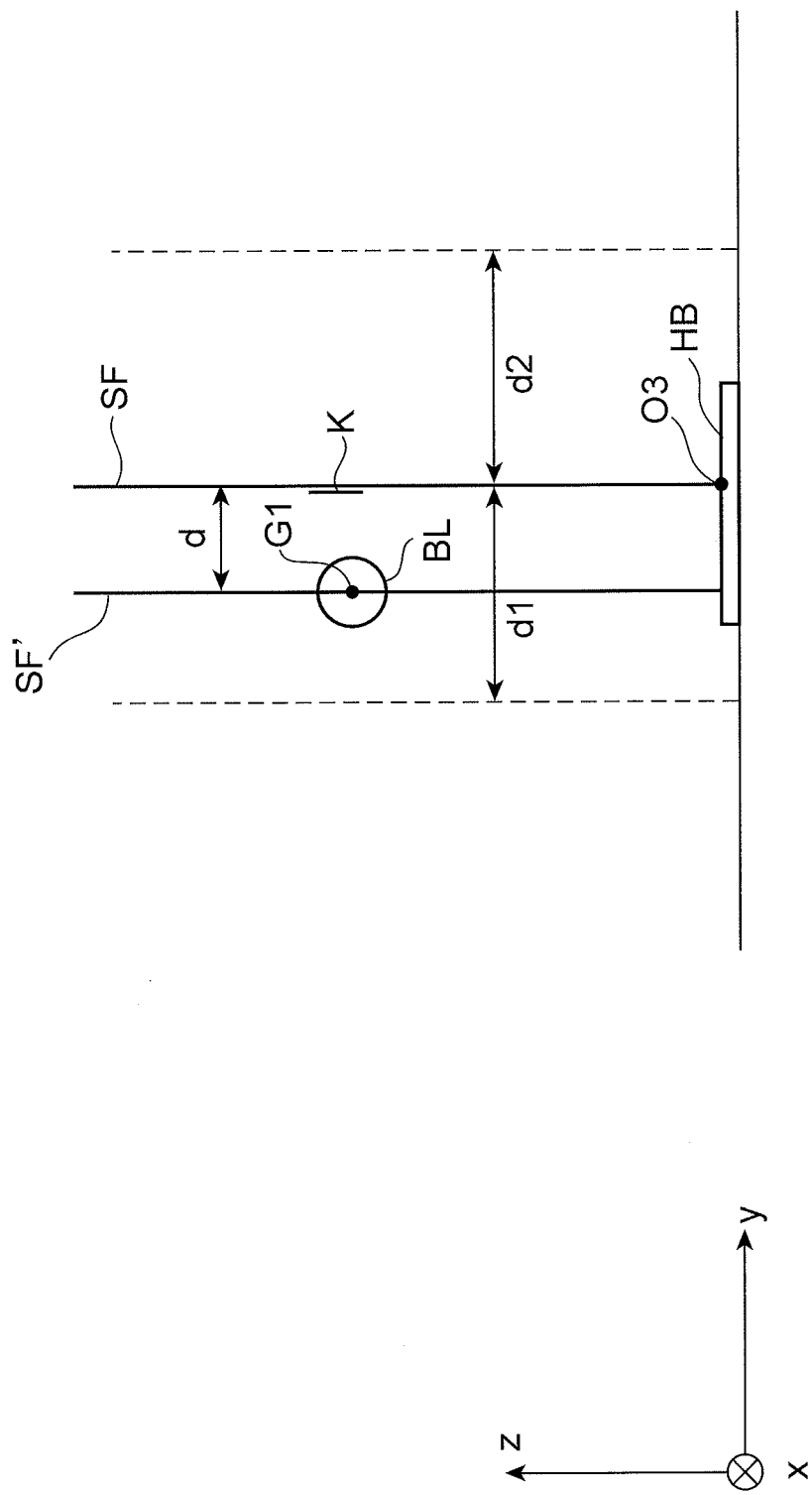

GAME DEVICE, COMPUTER-READABLE RECORDING MEDIUM, AND GAME CONTROL METHOD

TECHNICAL FIELD

The present invention relates to a technique for controlling progress of a game in which an action is virtually applied to a mobile object that moves in a game space.

BACKGROUND ART

Examples of conventionally known baseball games include a baseball game such as that described in Patent Document 1 in which a game player manipulates an arrow key provided on a controller to move and display a meet cursor upward, downward, leftward, or rightward on a screen, and the game player presses a predetermined button on the controller when a central portion of the meet cursor becomes consistent with a central portion of a ball object in order to hit the ball object with a bat held by a batter character.

In addition, recently, game devices are known in which a game player performs manipulations using a stylus. Baseball games that are executed on such game devices include a baseball game executed on a baseball game device disclosed in Patent Document 2 in which a meet point is displayed by bringing a stylus into contact with a monitor and moving the stylus, and when a ball object reaches a hitting screen, a batter character hits the ball if the ball object is positioned within a predetermined range centered on the meet point.

Meanwhile, in recent years, touch terminal devices such as smartphones and tablet devices in which a user touches a touch screen with a finger to input various manipulation commands are becoming increasingly widespread.

When a game player attempts to execute a baseball game involving manipulating a meet cursor on a touch information terminal device, the game player brings a finger into contact with a display unit and moves the finger to manipulate the meet cursor. However, in this case, a problem may conceivably occur in that the finger of the game player manipulating the meet cursor obstructs display of a ball object that is moved and displayed on. Consequently, since the game player must manipulate the meet cursor by instinct, the meet cursor cannot be accurately positioned on the ball object that is being moved and displayed. As a result, the operability deteriorates and the charm and appeal of the game declines significantly.

In addition, while a game player must input a hitting command in the baseball game described above, when a hitting button to be used by the game player for inputting the hitting command is displayed on a display unit in a touch terminal device, the game player who uses a finger on one hand to manipulate the meet cursor must touch the hitting button using a finger on the other hand. Such a manipulation method that involves the use of both hands cannot be a manipulation method suitable for touch manipulating terminals such as a smartphone which are based on one-handed input.

Patent Document 1: Japanese Patent Publication No. 3892889

Patent Document 2: Japanese Patent Publication No. 3822215

SUMMARY OF THE INVENTION

An object of the present invention is to provide a game device, a game control program, and a game control method capable of preventing an indicator such as a finger from obstructing display of a mobile object that is moved and displayed on a display unit and improving operability for a game player.

A game device according to an aspect of the present invention is a game device that controls progress of a game in which an action is virtually applied to a mobile object that moves in a game space, wherein the game device includes: a manipulation display unit having a touch screen display unit; an aiming cursor display unit which displays, in an aiming cursor display region of the touch screen display unit, an aiming cursor for determining a position where an action is to be applied to the mobile object in the game space; a manipulation icon display unit which displays, in a manipulation icon display region that is separate from the aiming cursor display region on the touch screen display unit, a manipulation icon for manipulating the aiming cursor, and which moves and displays the manipulation icon in response to a movement of an indicator that is in contact with the manipulation icon; a manipulation command accepting unit which accepts a movement command that is inputted by a movement of the indicator that is in contact with the manipulation icon and a timing decision command that is inputted as the indicator is separated from the touch screen display unit after the contact movement; an aiming cursor linking control unit which moves and displays the aiming cursor on the touch screen display unit such that the aiming cursor is linked with a movement of the manipulation icon that is moved and displayed by the manipulation icon display unit; an action application timing deciding unit that decides an action application timing at which an action is applied to the mobile object based on a timing of acceptance of the timing decision command by the manipulation command accepting unit; and an action applying unit which applies an action to the mobile object when at least a part of the mobile object and a part of the aiming cursor overlap each other at the action application timing decided by the action application timing deciding unit.

A game control program and a game control method according to other aspects of the present invention have features similar to those of the game device described above.

BRIEF DESCRIPTION OF THE DRAWINGS

FIG. 3 is a flow chart showing an operation of a game device according to an embodiment of the present invention.

FIG. 7 are explanatory diagrams showing an example of processing by an aiming cursor linking control unit, wherein

FIG. 9 is a diagram showing an arrangement position of an aiming cursor in a game space.

FIG. 10 is an explanatory diagram of a hitting determination process that is executed by an action applying unit.

FIG. 11 are diagrams showing a calculation process of a direction of an initial velocity of a hit ball object, wherein

DESCRIPTION OF EMBODIMENTS

Figure 1:
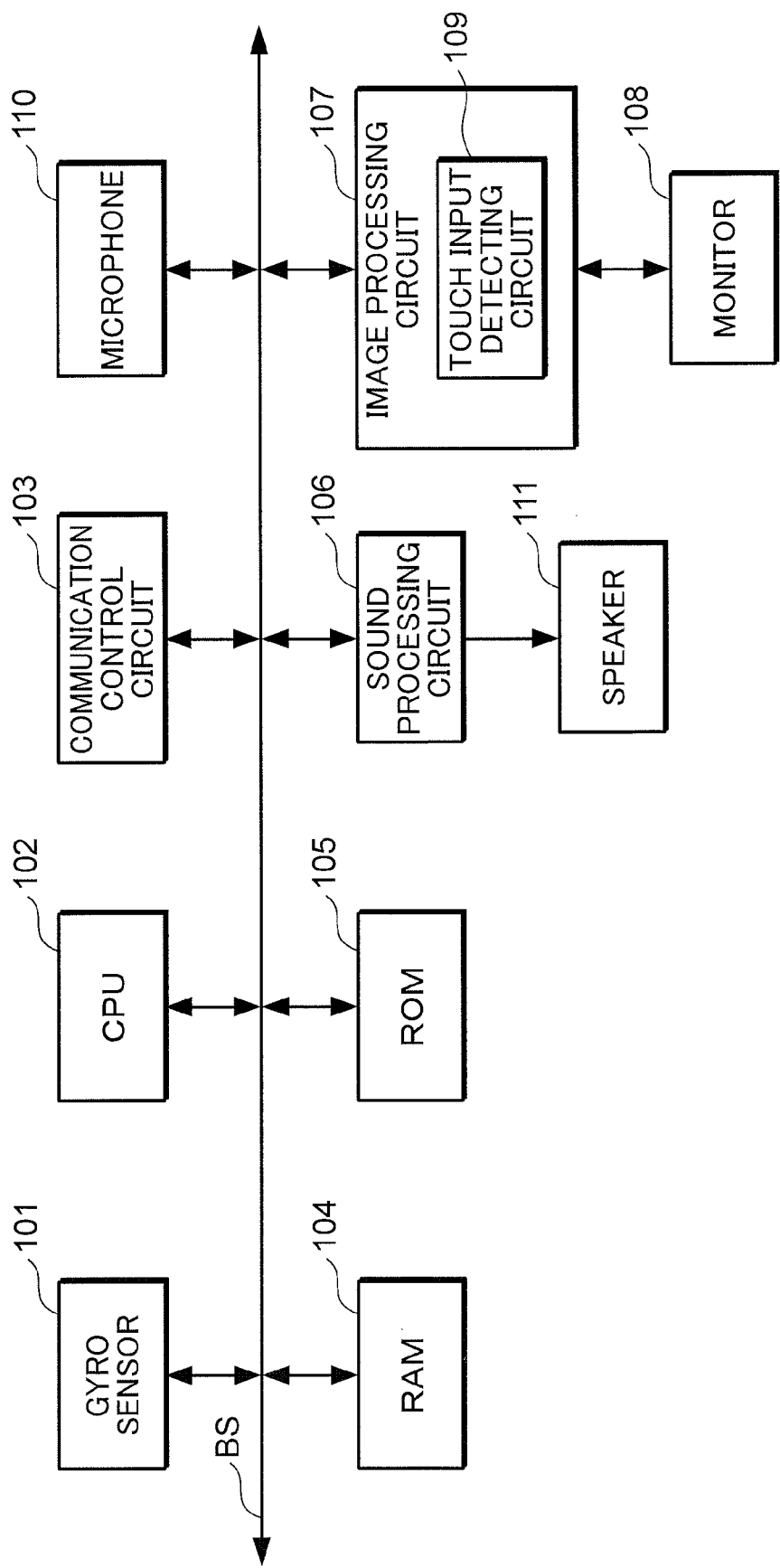
FIG. 1 is a block diagram of a game device according to an embodiment of the present invention.

Hereinafter, a game device according to an embodiment of the present invention will be described with reference to the drawings. FIG. 1 is a block diagram of a game device according to an embodiment of the present invention. In the present embodiment, for example, a touch information processing device such as a smartphone or a tablet device including a touch screen display unit is adopted as the game device. However, this example is purely illustrative and a mobile game device including a touch screen display unit may be adopted instead.

In addition, the present embodiment adopts, as a game, a baseball game in which a ball object BL (an example of a mobile object) that moves in a game space is positioned by an aiming cursor (which corresponds to a meet cursor in conventional games; the following description will be given based on an aiming cursor) and is hit back in a virtual manner.

The game device shown in FIG. 1 includes a gyro sensor 101, a CPU (Central Processing Unit) 102, a communication control circuit 103, a RAM (Random Access Memory) 104, a ROM (Read-Only Memory) 105, a sound processing circuit 106, an image processing circuit 107, a monitor 108, a microphone 110, and a speaker 111. The respective blocks from the gyro sensor 101 to the speaker 111 shown in FIG. 1 are connected to one another via a bus line BS.

The gyro sensor 101 is constituted by, for example, a gyro sensor capable of detecting an attitude of the game device in a roll direction and an attitude of the game device in a pitch direction, and detects respective angular velocities in the roll direction and the pitch direction and outputs an angular velocity signal.

The CPU 102 interprets commands from a game control program stored in the ROM 105 and performs various types of data processing and control. For example, the game control program is recorded on a computer-readable recording medium such as a DVD-ROM or a UMD (Universal Media Disc) and provided to a user. The user inserts the recording medium into a recording medium drive device (not shown) included in the game device, and the game device executes a game by reading the game control program from the recording medium.

The communication control circuit 103 performs a process involving subjecting transmission object data generated by the CPU 102 to spreading by CDMA (Code Division Multiple Access) or the like and modulating the spread data by QAM (Quadrature Amplitude phase Modulation), PSK (Phase Shift Keying), QPSK (Quadrature Phase Shift Keying), or the like and transmitting the modulated data, as well as a process involving demodulating received data, despreading the demodulated data, and outputting obtained data to the CPU 102.

The RAM 104 is a work area for the CPU 102. The ROM 105 stores programs and the like necessary for basic control (for example, activation control) of the game device.

The sound processing circuit 106 generates an analog audio signal in accordance with a command to produce audio from the CPU 102 and outputs the analog audio signal to the speaker 111. The image processing circuit 107 controls the monitor 108 according to a drawing command from the CPU 101 and displays a predetermined image on the monitor 108. The microphone 110 converts sound created by a game player into an electric signal.

The image processing circuit 107 includes a touch input detecting circuit 109 and displays various images on the monitor 108. For example, when an indicator such as a stylus or a finger of a game player comes into direct contact with the monitor 108, the touch input detecting circuit 109 outputs coordinate data of a contact position to the CPU 102 and causes the CPU 102 to recognize the contact position.

In addition, when an indicator comes into direct contact with the monitor 108 at a position of an object displayed on the monitor 108, the touch input detecting circuit 109 outputs coordinate data of the object to the CPU 102 and causes the CPU 102 to recognize that the object has been touched.

The monitor 108 is constituted by, for example, a touch screen LCD panel. For example, a capacitance type touch screen or a resistive touch screen may be adopted as the touch screen. Alternatively, for example, a TFT (Thin Film Transistor) LCD panel or an STN (Super Twisted Nematic) LCD panel may be adopted as the touch screen to enable display in 4096 colors.

Figure 2:
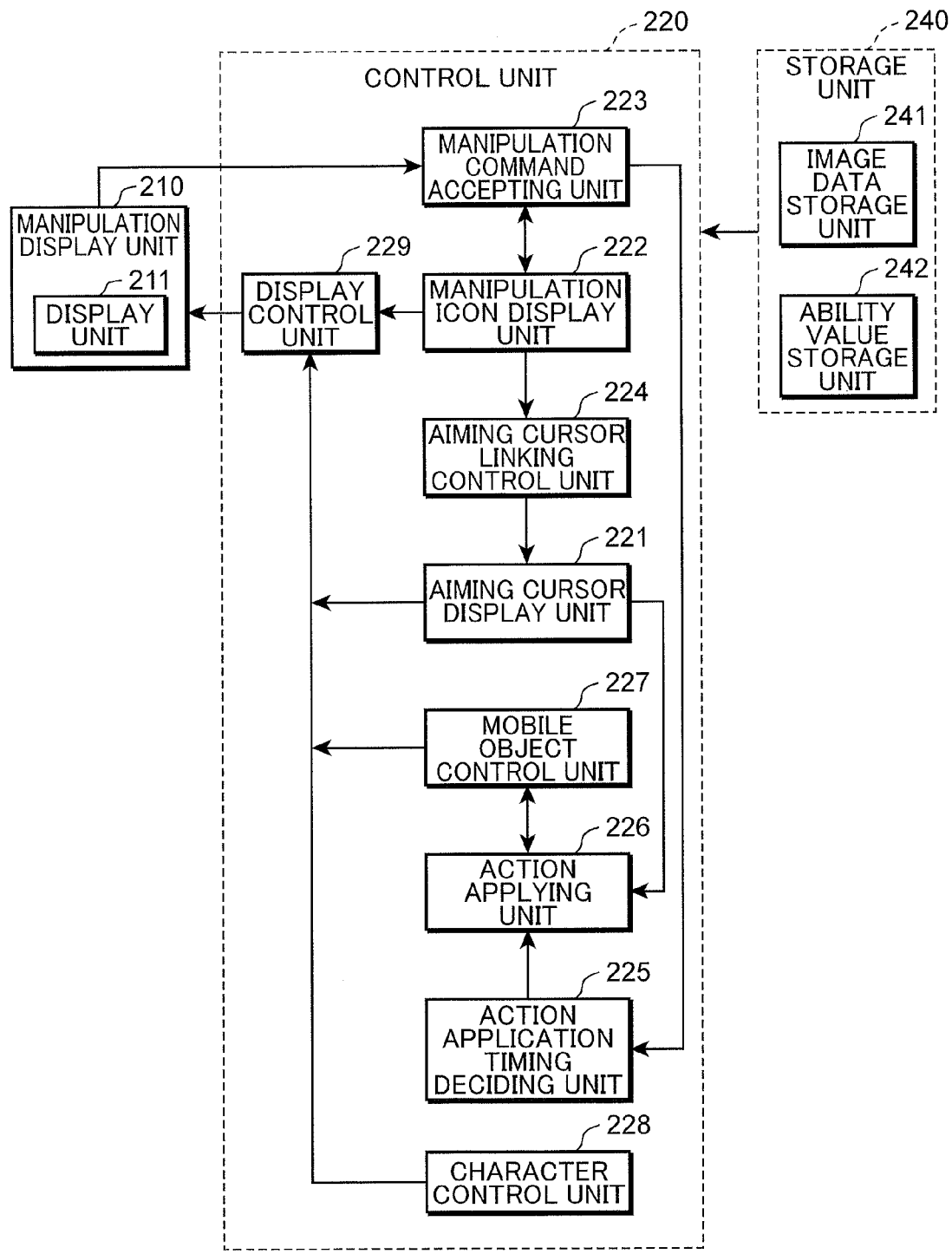
FIG. 2 is a functional block diagram of the game device shown in FIG. 1.

FIG. 2 is a functional block diagram of the game device shown in FIG. 1. As shown in FIG. 2, the game device includes a manipulation display unit 210, a control unit 220, and a storage unit 240.

The manipulation display unit 210 includes the touch input detecting circuit 109, the monitor 108, and the like shown in FIG. 1, and accepts various manipulation instructions inputted by the game player and displays various images. In the present embodiment, the game player brings an indicator into contact with a display unit 211 of the manipulation display unit 210 to input a manipulation command to the manipulation display unit 210. While a stylus may be adopted as the indicator, the present embodiment adopts a finger of the game player as the indicator. In addition, the display unit 211 refers to a rectangular region in which images are displayed among the manipulation display unit 210.

The control unit 220 is constituted by, for example, the CPU 102, the RAM 104, the ROM 105, the image processing circuit 107, and the like shown in FIG. 1, and includes an aiming cursor display unit 221, a manipulation icon display unit 222, a manipulation command accepting unit 223, an aiming cursor linking control unit 224, an action application timing deciding unit 225, an action applying unit 226, a mobile object control unit 227, a character control unit 228, and a display control unit 229. These functions are realized as the CPU 102 executes a game control program according to an embodiment of the present invention.

The aiming cursor display unit 221 supplies the display control unit 229 with a drawing command that causes an aiming cursor for determining a position where an action is to be applied to a ball object in a game space to be displayed in an aiming cursor display region of the display unit 211. In this case, the aiming cursor linking control unit 224 periodically supplies coordinate data indicating a position of the aiming cursor to the aiming cursor display unit 221, and the aiming cursor display unit 221 supplies a drawing command for updating display of the aiming cursor to the display control unit 229 based on the coordinate data.

Figure 5:
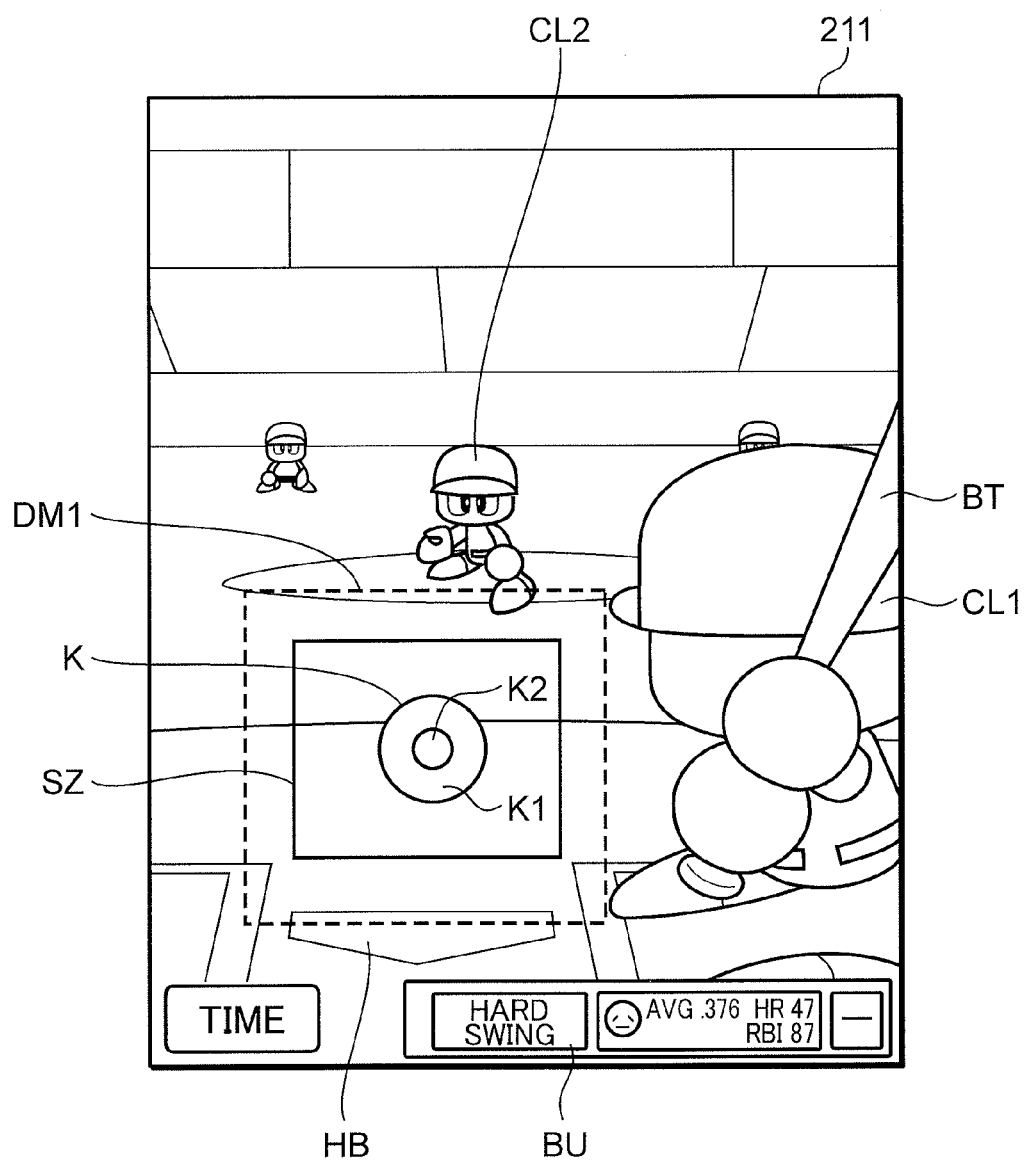
FIG. 5 is a diagram showing an example of an aiming cursor displayed on a display unit.

FIG. 5 is a diagram showing an example of an aiming cursor K displayed on the display unit 211. As shown in FIG.

5, the aiming cursor K is displayed in a rectangular aiming cursor display region DM1 provided on the display unit 211. The aiming cursor display region DM1 is provided approximately at center of the display unit 211. In addition, the aiming cursor display region DM1 has a slightly larger size than a strike zone SZ that is provided almost directly above a home base HB. The strike zone SZ is a virtual representation of a strike zone that is set directly above a home base in real-life baseball and has a rectangular shape.

By setting the size of the aiming cursor display region DM1 larger than the size of the strike zone SZ, the game player can have a batter character CL1 hit a ball outside of the strike zone SZ. In the present embodiment, a center of the aiming cursor display region DM1 is set at a same position as a center of the strike zone SZ and a shape of the aiming cursor display region DM1 is similar to a shape of the rectangular strike zone SZ.

The aiming cursor K has a central region K2 and a peripheral region K1. The central region K2 is circular and the peripheral region K1 has a donut shape that encloses the central region K2. In the example shown in FIG. 5, the central region K2 is displayed in a darker color than the peripheral region K1.

When a hard swing button BU displayed in a lower part of the display unit 211 is touched by the game player and a hard swing mode is set, a size of the aiming cursor K changes to a size that solely consists of the central region K2. When the hard swing button BU is once again touched by the game player and the hard swing mode is canceled, the size of the aiming cursor K is restored to a size consisting of the central region K2 and the peripheral region K1.

In other words, when the hard swing mode is set, the size of the aiming cursor K becomes smaller and positioning the aiming cursor K on a ball object becomes more difficult compared to a case where the hard swing mode is not set. However, as a trade-off, when the hard swing mode is set, a hitting power of the batter character CL1 increases compared to a case where the hard swing mode is not set.

Moreover, the size of the aiming cursor K varies according to ability values set in advance for each of the batter characters CL1. Specifically, the aiming cursor display unit 221 reads an ability value of the hatter character CL1 from an ability value storage unit 242 and, the greater the ability value, the larger the size of the aiming cursor K set by the aiming cursor display unit 221.

Returning now to FIG. 2, the manipulation icon display unit 222 supplies the display control unit 229 with a drawing command to have a manipulation icon CM for manipulating the aiming cursor K displayed in a manipulation icon display region DM2 on the display unit 211 that is separate from the aiming cursor display region DM1. In addition, the manipulation icon display unit 222 supplies a drawing command to the display control unit 229 so that the manipulation icon CM is moved and displayed according to a movement of a finger YB that is in contact with the manipulation icon CM.

Figure 6:
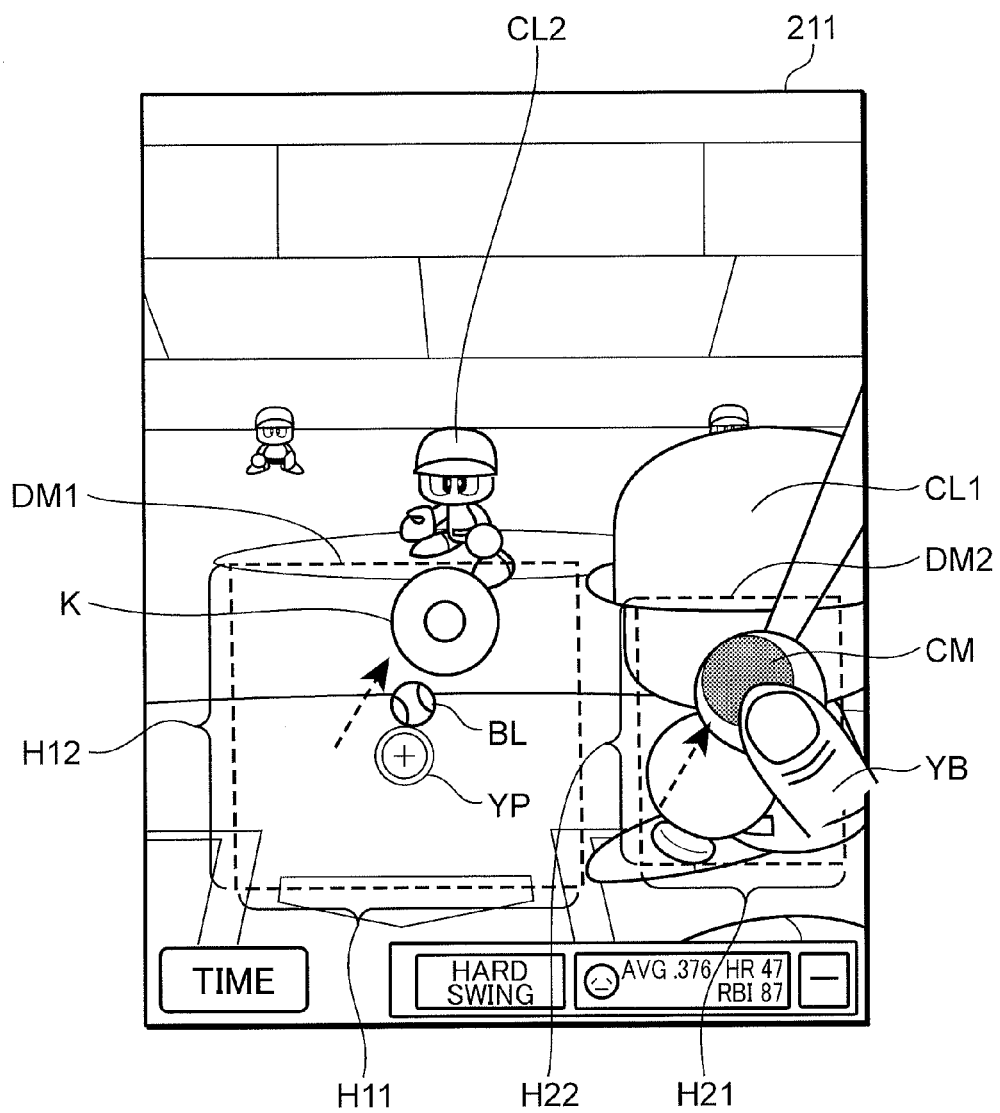
FIG. 6 is a diagram showing an example of a manipulation icon displayed on a display unit.

FIG. 6 is a diagram showing an example of the manipulation icon CM displayed on the display unit 211. As shown in FIG. 6, the manipulation icon CM is displayed in a rectangular manipulation icon display region DM2 provided on the display unit 211. The manipulation icon CM is a circle whose surface area is greater by a predetermined size than a surface area of a region in which the finger YB and the display unit 211 come into contact with each other. By setting the size of the manipulation icon CM somewhat larger than the surface area of the region in which the finger YB and the display unit 211 come into contact with each other, the manipulation icon CM can be prevented from being hidden under by the finger YB and operability can be improved.

By touching the manipulation icon CM with the finger YB and moving the finger YB in the manipulation icon display region DM2 while maintaining contact with the display unit 211, the game player can move the manipulation icon CM so as to track the movement of the finger YB. Specifically, for example, when a pitcher character CL2 winds up to throw the ball object BL, the manipulation icon display unit 222 supplies a drawing command for having the manipulation icon CM displayed at a predetermined initial position in the manipulation icon display region DM2 to the display control unit 229. In this case, for example, a center of the manipulation icon display region DM2 is adopted as the initial position.

In addition, when the finger YB of the game player comes into contact with the manipulation icon CM and a movement command for moving the manipulation icon CM is accepted by the manipulation command accepting unit 223, coordinate data of a contact position of the finger YB on the display unit 211 is supplied to the manipulation icon display unit 222 from the manipulation command accepting unit 223. Subsequently, the manipulation icon display unit 222 supplies the display control unit 229 with a drawing command for causing the display unit 211 to display the manipulation icon CM so that a center of the manipulation icon CM is positioned at the coordinate data supplied from the manipulation command accepting unit 223. Furthermore, every time coordinate data is periodically supplied from the manipulation command accepting unit 223, the manipulation icon display unit 222 supplies a drawing command to the display control unit 229 to have the display of the manipulation icon CM updated. Accordingly, the manipulation icon CM is moved and displayed so as to track the contact movement of the finger YB. Moreover, coordinate data has a two-dimensional data structure having a value of a vertical coordinate and a value of a horizontal coordinate as defined by the display unit 211.

The manipulation icon display region DM2 is provided adjacent to the right of the aiming cursor display region DM1 and at a right end of the display unit 211. By setting the manipulation icon display region DM2 to the right end in this manner, the game player is able to manipulate the aiming cursor K by manipulating the manipulation icon CM using the right hand without having to straddle the strike zone SZ. Therefore, the game player can prevent his/her own right hand from blocking the view of the ball object BL and can accurately assess a trajectory of the ball object BL until the ball object BL reaches the strike zone SZ.

Moreover, when a dominant hand setting manipulation command is accepted by the manipulation command accepting unit 223, information indicating whether the game player is left-handed or right-handed is supplied from the manipulation command accepting unit 223 to the manipulation icon display unit 222. When information indicating that the game player is left-handed is supplied from the manipulation command accepting unit 223, the manipulation icon display unit 222 sets the manipulation icon display region DM2 adjacent to the left of the aiming cursor display region DM1 to a left end position on the display unit 211.

On the other hand, when information indicating that the game player is right-handed is supplied from the manipulation command accepting unit 223, the manipulation icon display unit 222 sets the manipulation icon display region DM2 to the right end of the display unit 211. In this manner, since the manipulation icon display region DM2 is set to the right end or the left end of the display unit 211 depending on a dominant hand of the game player, the game player can manipulate the manipulation icon CM using the finger YB of his/her own dominant hand without straddling the aiming cursor display region DM1. As a result, the trajectory of the ball object BL can be accurately assessed and operability can be improved.

In addition, when a timing decision command is accepted by the manipulation command accepting unit 223, the manipulation icon display unit 222 supplies a drawing command for hiding the manipulation icon CM to the display control unit 229.

The present embodiment adopts a mode which prohibits the game player from manipulating the aiming cursor K once a timing decision command is inputted. Therefore, if the manipulation icon CM continues to be displayed after a timing decision command is inputted, the game player may be misled into thinking that the manipulation icon CM can perhaps be manipulated. In consideration thereof, by hiding the manipulation icon CM once a timing decision command is inputted, the game player can avoid being misled in such a manner. In addition, by erasing an unnecessary image from the display unit 211, operability can also be improved.

Furthermore, if a timing decision command is not inputted by the player before the ball object BL reaches a movement end position PE (refer to FIG. 9), the manipulation icon display unit 222 supplies a drawing command for hiding the manipulation icon CM to the display control unit 229 when the ball object BL reaches the movement end position PE.

While the present embodiment adopts a mode which prohibits the game player from manipulating the aiming cursor K once a timing decision command is inputted, the game player may choose not to input a timing decision command in order to have the batter character CL1 let the ball object BL go by. In this case, if the manipulation icon CM continues to be displayed even after the ball object BL reaches the movement end position PE, the manipulation icon CM is to be displayed even if there is no need to manipulate the manipulation icon CM and may give the game player a feeling of strangeness. In order to prevent this, in the present embodiment, the manipulation icon CM is hidden once the ball object BL reaches the movement end position PE.

Moreover, while the aiming cursor display region DM1 and the manipulation icon display region DM2 are depicted in FIGS. 5 and 6 for the sake of description, the aiming cursor display region DM1 and the manipulation icon display region DM2 may actually be hidden. Accordingly, a decline in visibility due to an increased number of graphics displayed on the display unit 211 can be suppressed. However, in order to clearly show the aiming cursor display region DM1 and the manipulation icon display region DM2 to the game player, both regions may be displayed on the display unit 211. In addition, the aiming cursor display region DM1 and the manipulation icon display region DM2 may be displayed only for a certain period of time before the pitcher character CL2 starts a pitching motion. Accordingly, both regions can be clearly shown to the game player and, at the same time, a decline in visibility can be suppressed.

Furthermore, in the present embodiment, a size of the manipulation icon display region DM2 is smaller than a size of the aiming cursor display region DM1. In addition, a shape of the manipulation icon display region DM2 is similar to a shape of the aiming cursor display region DM1.

Returning now to FIG. 2, the manipulation command accepting unit 223 accepts a movement command that is inputted by a movement of the finger YB that is brought into contact with the manipulation icon CM and, after the contact movement, a timing decision command that is inputted by separating the finger YB from the display unit 211.

In this case, coordinate data indicating a current display position of the manipulation icon CM is notified to the manipulation command accepting unit 223 from the manipulation icon display unit 222 whenever necessary, and the manipulation command accepting unit 223 recognizes the current display position of the manipulation icon CM. In addition, coordinate data indicating a current contact position of the finger YB and the display unit 211 is supplied to the manipulation command accepting unit 223 from the manipulation display unit 210, and the manipulation command accepting unit 223 recognizes the current contact position.

Therefore, when the current contact position is within a predetermined range (a range of the manipulation icon CM) relative to the current display position of the manipulation icon CM, the manipulation command accepting unit 223 judges that input of a movement command has been started by the game player. In addition, after judging that a movement command has been inputted, the manipulation command accepting unit 223 tracks a contact position of the finger YB until the finger YB separates from the display unit 211, and periodically supplies contact position coordinate data to the manipulation icon display unit 222. Accordingly, the manipulation icon CM is moved and displayed so as to track the finger YB performing a contact movement.

In this case, while the finger YB is in contact with the display unit 211, the manipulation display unit 210 periodically supplies contact position coordinate data to the manipulation command accepting unit 223. Therefore, when the periodical supply of coordinate data from the manipulation display unit 210 is discontinued, the manipulation command accepting unit 223 is able to judge that input of a movement command has been completed and that a timing decision command has been inputted. Subsequently, when the manipulation command accepting unit 223 judges that a timing decision command has been inputted, the manipulation command accepting unit 223 suspends supply of coordinate data indicating a contact position of the finger YB to the manipulation icon display unit 222.

The aiming cursor linking control unit 224 moves and displays the aiming cursor K to the display unit 211 such that the aiming cursor K is linked with the movement of the manipulation icon CM that is moved and displayed by the manipulation icon display unit 222. As shown in FIG. 6, if the manipulation icon CM has moved in the direction of an arrow due to the game player moving the finger YB in the direction of an arrow, then the aiming cursor K is moved in a same direction indicated by the arrow. If a mode is adopted in which the game player directly manipulates the aiming cursor K by bringing the finger YB into contact with the aiming cursor K, since the finger YB is positioned inside the strike zone SZ, the finger YB blocks the view of the ball object BL and makes it difficult for the game player to accurately position the aiming cursor K on the ball object BL.

In consideration thereof, in the present embodiment, the game player manipulates the aiming cursor K by bringing the finger YB into contact with the manipulation icon CM and manipulating the manipulation icon CM instead of bringing the finger YB into contact with the aiming cursor K and directly manipulating the aiming cursor K. In addition, the manipulation icon CM is displayed in the manipulation icon display region DM2 that is provided at a separate position from the aiming cursor display region DM1. Therefore, even if the finger YB comes into contact with the manipulation icon CM, the finger YB does not block the view of the ball object BL and the game player can accurately position the manipulation icon CM on the ball object BL. As a result, the operability when positioning the aiming cursor K on the ball object BL is improved and the charm and appeal of the game can be enhanced.

Figure 7A:
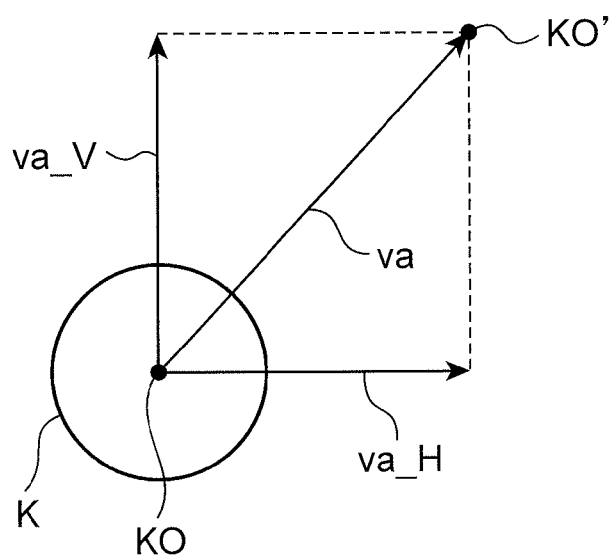
FIG. 7A shows an aiming cursor shown at a position inside an aiming cursor display region.
Figure 7B:
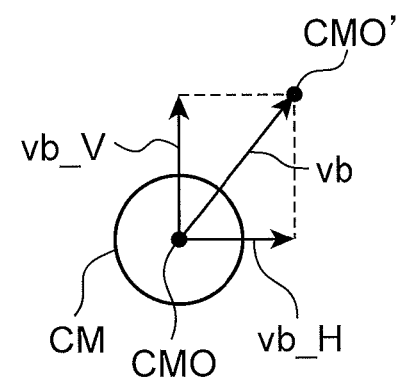
FIG. 7B shows a manipulation icon shown at a position inside a manipulation icon display region.

FIG. 7 are explanatory diagrams showing an example of processing by the aiming cursor linking control unit 224, wherein FIG. 7A shows the aiming cursor K shown at a position KO inside the aiming cursor display region DM1, and FIG. 7B shows the manipulation icon CM shown at a position CMO inside the manipulation icon display region DM2.

Let us assume that, at the position CMO, the manipulation icon CM has been moved at a velocity vb due to manipulation by the finger YB of the game player. In this case, the aiming cursor linking control unit 224 multiplies a velocity component vb_V of a vertical coordinate of the velocity vb by a coefficient kV to obtain a velocity component va_V (=vb_V·kV) of a vertical coordinate of the aiming cursor K. In addition, the aiming cursor linking control unit 224 multiplies a velocity component vb_H of a horizontal coordinate of the velocity vb by a coefficient kH to obtain a velocity component va_H (=vb_H·kH) of a horizontal coordinate of the aiming cursor K. Furthermore, the aiming cursor linking control unit 224 instructs a position KO' whose vertical coordinate is separated from the position KO by the velocity component va_V and whose horizontal coordinate is separated from the position KO by the velocity component va_H to the aiming cursor display unit 221 as a next display position of the aiming cursor K, and causes the aiming cursor display unit 221 to display the aiming cursor K at the position KO'. Accordingly, the aiming cursor K moves from the position KO to the position KO'. At the same time, the manipulation icon CM is moved by the manipulation icon display unit 222 from the position CMO to a position CMO'. As a result, the aiming cursor K moves so as to be linked with the movement of the manipulation icon CM.

Moreover, for example, coordinate data of the manipulation icon CM is periodically supplied from the manipulation icon display unit 222 to the aiming cursor linking control unit 224, and the aiming cursor linking control unit 224 obtains a velocity vb of the manipulation icon CM and then obtains a velocity va of the aiming cursor K from the obtained velocity vb every time coordinate data is supplied.

As shown in FIG. 6, if a length of a vertical side of the aiming cursor display region DM1 is denoted by H12 and a length of a vertical side of the manipulation icon display region DM2 is denoted by H22, then the coefficient kV has a relationship expressed as kV=H12/H22. In addition, if a length of a horizontal side of the aiming cursor display region DM1 is denoted by H11 and a length of a horizontal side of the manipulation icon display region DM2 is denoted by H21, then a relationship expressed as kH=H11/H21 is true. In other words, there is a certain ratio RT (coefficients kV and kH) between the velocity va of the aiming cursor K and the velocity vb of the manipulation icon CM.

Furthermore, the aiming cursor linking control unit 224 sets an initial position of the aiming cursor K at center of the aiming cursor display region DM1 and the manipulation icon display unit 222 sets an initial position of the manipulation icon CM at center of the manipulation icon display region DM2. Therefore, the ratio RT is to be set to a value that causes the manipulation icon CM to move from its initial position to an end of the manipulation icon display region DM2 when the aiming cursor K moves from its initial position to an end of the aiming cursor display region DM1.

As a result, even if sizes of the aiming cursor display region DM1 and the manipulation icon display region DM2 differ from each other, the game player can move the aiming cursor K over the entire aiming cursor display region DM1. For example, if the velocity va is set equal to velocity vb despite the aiming cursor display region DM1 being larger than the manipulation icon display region DM2, a situation may occur where the manipulation icon CM reaches the end of the manipulation icon display region DM2 even though the aiming cursor K has not yet reached the end of the aiming cursor display region DM1. In this case, a dead space is created in the aiming cursor display region DM1 in which the aiming cursor K cannot be moved and the game player is unable to have the batter character CL1 hit a ball object that has reached the dead space.

In consideration thereof, the present embodiment prevents a dead space from being created by setting the ratio RT as described above and, at the same time, setting the initial position of the manipulation icon CM at the center of the manipulation icon display region DM2 and setting the initial position of the aiming cursor K at the center of the aiming cursor display region DM1.

Moreover, the initial position of the manipulation icon CM may be set to a position other than the center of the manipulation icon display region DM2. In this case, the initial position of the aiming cursor K in the aiming cursor display region DM1 need only be set to a position corresponding to the initial position of the manipulation icon CM in the manipulation icon display region DM2. In this case, a corresponding position refers to a position where a relative position in the aiming cursor display region DM1 and a relative position in the manipulation icon display region DM2 are the same.

In the present embodiment, since the aiming cursor display region DM1 and the manipulation icon display region DM2 are similar, the coefficients kV and kH are set such that coefficient kV=coefficient kH is true.

Returning now to FIG. 2, the action application timing deciding unit 225 decides an action application timing at which an action is applied to the ball object BL based on a timing at which a timing decision command had been accepted by the manipulation command accepting unit 223.

Figure 8:
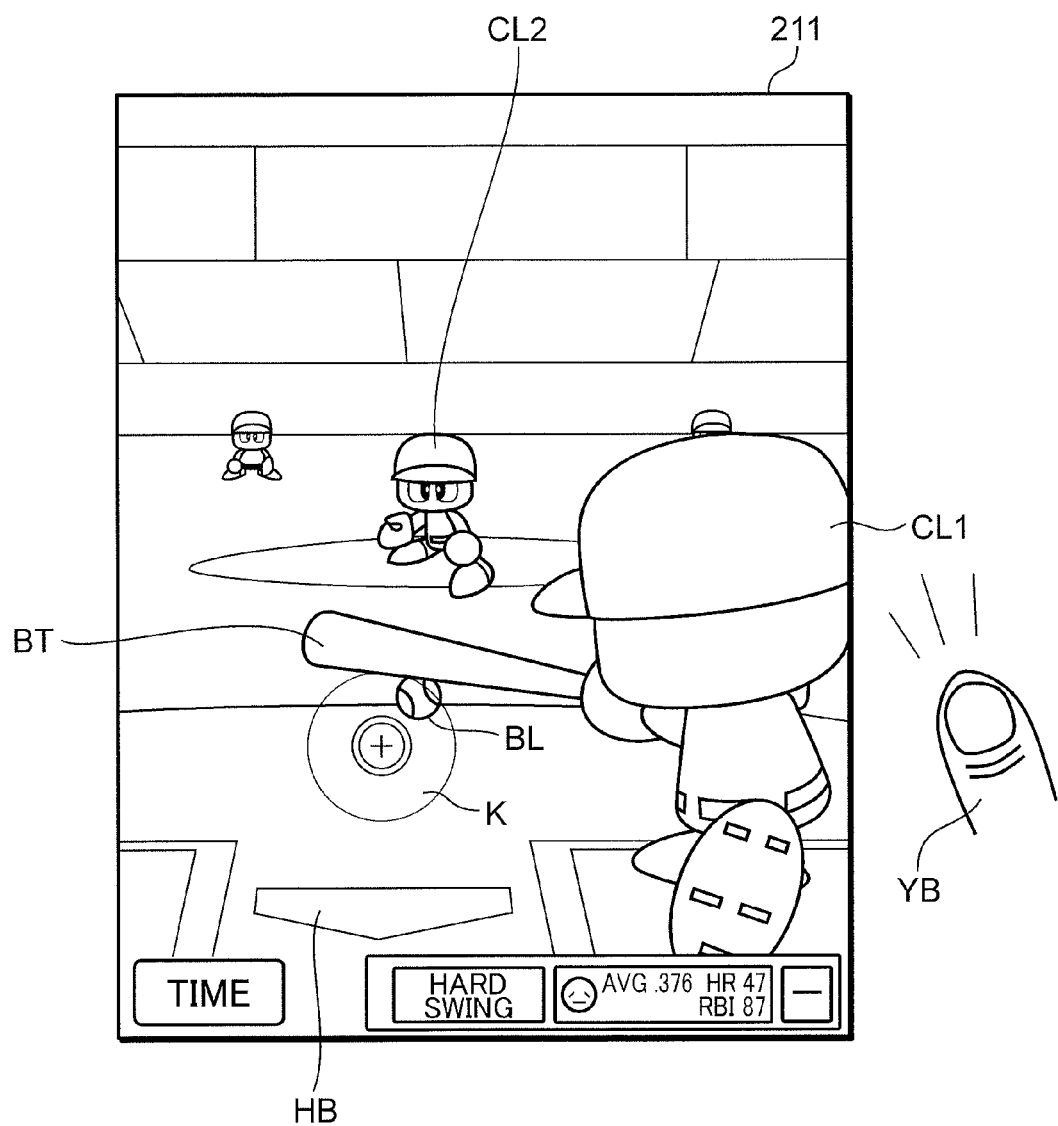
FIG. 8 is a screen view after a timing decision command has been inputted by a game player and immediately before a bat object strikes a ball object.

FIG. 8 is a screen view after a timing decision command has been inputted by the game player and immediately before a bat object BT strikes the ball object BL. When a timing decision command is inputted by the game player, the batter character CL1 starts a swinging motion of the bat object BT. Therefore, the action application timing deciding unit 225 decides a moment upon lapse of a predetermined amount of time that it takes from input of a timing decision command to the bat object BT reaching a hitting zone provided directly above the home base HB as an action application timing.

Moreover, when a timing decision command is inputted by a game player, as shown in FIG. 8, the manipulation icon CM is hidden, the aiming cursor K is locked, and the game player is no longer able to manipulate the aiming cursor K. In this case, the aiming cursor K is translucently displayed and the game player can recognize that the aiming cursor K has been locked.

As shown, in the present embodiment, the game player moves the manipulation icon CM by bringing the finger YB into contact with the manipulation icon CM, anticipates an arrival position of the ball object BL in the hitting zone, positions the aiming cursor K at the anticipated arrival position, and releases the finger YB from the display unit 211 to input a hitting command.

Returning now to FIG. 2, the action applying unit 226 performs a hitting determination process of determining whether or not at least a part of the ball object BL and a part of the aiming cursor K overlap each other at the action application timing decided by the action application timing deciding unit 225, and when it is determined by the hitting determination process that at least a part of the ball object BL and a part of the aiming cursor K overlap each other, the action applying unit 226 applies an action to the ball object BL.

FIG. 9 is a diagram showing an arrangement position of the aiming cursor K in the game space. In the present embodiment, a virtual three-dimensional space defined by three mutually perpendicular axes, namely, an x-axis, a y-axis, and a z-axis, is adopted as the game space.

Moreover, the y-axis shown in FIG. 9 is set in a direction parallel to a line L3 that connects a center O2 of a pitcher's mound and a center O3 of the home base HB in the virtual three-dimensional space, the z-axis is set in a vertical direction, and the x-axis is set in a direction that is perpendicular to the vertical direction and to the line L3.

In the present embodiment, for example, the aiming cursor K passes the center O3 of the home base HB and moves over the hitting zone SF that is parallel to an x-z plane. Moreover, the aiming cursor display region DM1 shown in FIG. 8 shows a region when the hitting zone SF shown in FIG. 9 is displayed on the display unit 211. Moreover, in FIG. 9, the pitcher character CL2 is arranged at the center O2 of the pitcher's mound and the batter character CL1 is arranged in a batter's box BX that is arranged to the left or to the right of the home base in the x-direction. In addition, the pitcher character CL2 starts a pitching motion after performing a windup motion and throws the ball object BL toward home base HB. In the present embodiment, a position where the pitcher character CL2 releases the ball object BL is assumed to be a movement start position PS of the ball object BL. In addition, a catcher character (not shown) is arranged behind the home base HB in the y-axis direction, and a position where the catcher character catches the ball object BL is assumed to be a movement end position PE of the ball object BL.

Therefore, it is apparent that the hitting zone SF is set between the movement start position PS and the movement end position PE.

FIG. 10 is an explanatory diagram of a hitting determination process that is executed by the action applying unit 226. Moreover, FIG. 10 represents a state where the virtual three-dimensional space shown in FIG. 9 is viewed in the x-axis direction. Specifically, upon input of a timing decision command, the action applying unit 226 inquires the mobile object control unit 227 for, and acquires, a position of the ball object BL at the action application timing decided by the action application timing deciding unit 225.

Subsequently, when the ball object BL intersects with or is in contact with the aiming cursor K over the hitting zone SF, a determination is made that the ball object BL has been hit.

However, this may increase the degree of difficulty of the game and make the game less fun. In consideration thereof, in the present embodiment, it is determined that the ball object BL is hit at an action application timing when, for example, a y-component of the ball object BL exists between a position separated by a distance d1 in a −y-direction from the hitting zone SF and a position separated by a distance d2 in a +y-direction from the hitting zone SF and, at the same time, an extended line of the ball object BL at that moment intersects the aiming cursor K over the hitting zone SF.

In this case, for example, a line extended from a center of gravity G1 of the ball object BL in a direction of a velocity of the ball object BL at the action application timing can be adopted as the extended line of the ball object BL.

Alternatively, in a case where the y-component of the ball object BL exists between a position separated by a distance d1 from the hitting zone SF and a position separated by a distance d2 from the hitting zone SF at the action application timing, a determination may be made that the ball object BL has been hit when a plane SF' which passes the center of gravity G1 of the ball object BL and which is parallel to the hitting zone SF is set, the aiming cursor K over the hitting zone SF is projected on to the set plane SF', and the ball object BL exists in a region of the projected aiming cursor K.

Moreover, as d1 and d2, distances obtained by adding or subtracting a distance equivalent to a length of a y-component of the strike zone or a small margin to/from the hitting zone SF may be adopted.

In addition, the action applying unit 226 sets a higher hitting power when a position of passage of the center of gravity of the ball object BL relative to the aiming cursor K is closer to a center of gravity of the aiming cursor K at the moment an action application timing is decided by the action application timing deciding unit 225.

Figure 11A:
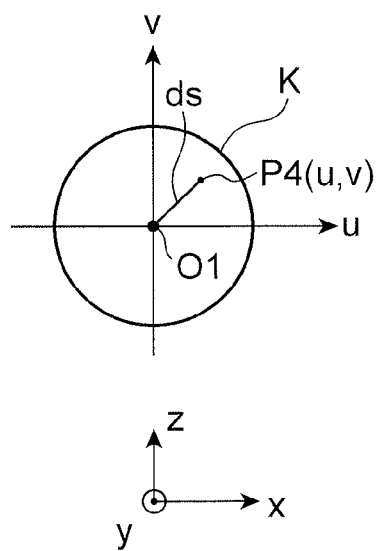
FIG. 11A shows an aiming cursor.
Figure 11B:
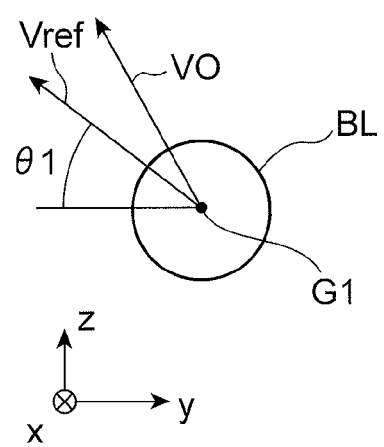
FIG. 11B shows a state of viewing, in an x-direction, a ball object immediately after being hit.
Figure 11C:
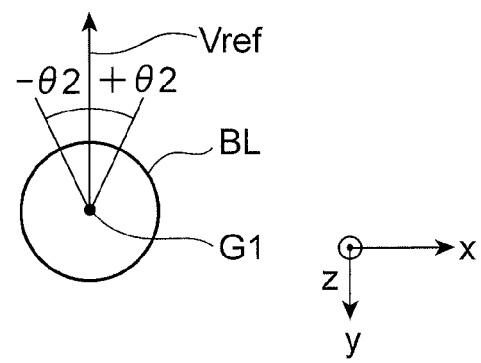
FIG. 11C shows a state where a ball object immediately after being hit is viewed from a z-direction.

FIG. 11 are diagrams showing a calculation process of a direction of an initial velocity of the ball object BL that has been hit, wherein FIG. 11A shows the aiming cursor K, FIG. 11B shows a state of viewing, in the x-direction, the ball object BL immediately after being hit, and FIG. 11C shows a state where the ball object BL immediately after being hit is viewed from the z-direction.

As shown in FIG. 11A, let us assume that the center of gravity G1 of the ball object BL has passed a point P4 (u, v) in the aiming cursor K, where u denotes a coordinate axis which passes the center O1 of the aiming cursor K and which is parallel to the x-axis and v denotes a coordinate axis which passes the center O1 and which is parallel to the z-axis.

In this case, the action applying unit 226 may obtain a distance ds between the point P4 and the center O1, obtain a correction coefficient $\beta1$ for setting a lower reference initial velocity Vref as the distance ds increases, correct a magnitude of the reference initial velocity Vref by multiplying the reference initial velocity Vref by the correction coefficient $\beta1$ ($\beta1 \cdot$Vref), and set a magnitude of the corrected reference initial velocity Vref as a magnitude of the initial velocity V0.

Moreover, the action applying unit 226 may calculate the correction coefficient $\beta1$ using a predetermined function which outputs the correction coefficient ($\beta1$ and receives input of the distance ds and which increases the correction coefficient $\beta1$ as the distance ds decreases.

Next, a method of calculating a direction of the initial velocity V0 of the ball object BL will be described with reference to FIGS. 11A to 11C. As shown in FIG. 11A, if v of the point P4 has a negative value, it is determined that a hitting point by the bat object BT is positioned lower than a sweet spot of the bat object BT and, as shown in FIG. 11B, a pitch angle $\theta1$ of the reference initial velocity Vref is reduced according to the value of v, and the reduced pitch angle $\theta1$ of the reference initial velocity Vref is set as a pitch angle of the initial velocity V0.

On the other hand, if v of the point P4 has a positive value, it is determined that the hitting point by the bat object BT is positioned higher than the sweet spot of the bat object BT, the pitch angle $\theta1$ of the reference initial velocity Vref is increased according to the value of v, and the increased pitch angle $\theta1$ of the reference initial velocity Vref is set as the pitch angle of the initial velocity V0.

Furthermore, if u of the point P4 has a positive value, in a case of a right-handed batter, it is determined that the hitting point by the bat object BT is positioned on a side of a tip that is opposite to a bat handle relative to the sweet spot and, as shown in FIG. 11C, a yaw angle $\theta2$ of the reference initial velocity Vref is altered toward a +$\theta2$ side in accordance with the value of u, and the altered yaw angle $\theta2$ of the reference initial velocity Vref is set as a yaw angle of the initial velocity V0.

On the other hand, if u of the point P4 has a negative value, in a case of a right-handed batter, since the hitting point by the bat object BT is positioned on a side of the bat handle relative to the sweet spot, the yaw angle θ2 of the reference initial velocity Vref is altered toward a −θ2 side in accordance with the value of u, and the altered yaw angle θ2 of the reference initial velocity Vref is set as a yaw angle of the initial velocity V0.

In addition, as shown in FIG. 10, when the ball object BL is positioned on a −y-side relative to the hitting zone SF or, in other words, when a hitting timing of the ball object BL is premature at the action application timing, as shown in FIG. 11C, the yaw angle θ2 of the reference initial velocity Vref is increased toward a −θ2 side in accordance with the value of d in the case of a right-handed batter, and the increased yaw angle θ2 of the reference initial velocity Vref is set as a yaw angle of the initial velocity V0.

On the other hand, when the ball object BL is positioned on a +y-side relative to the hitting zone SF or, in other words, when a hitting timing of the ball object BL is belated at the action application timing, as shown in FIG. 11C, the yaw angle θ2 of the reference initial velocity Vref is increased toward a +θ2 side in accordance with the value of d in the case of a right-handed batter, and the increased yaw angle θ2 of the reference initial velocity Vref is set as the yaw angle of the initial velocity V0.

Returning now to FIG. 2 the mobile object control unit 227 moves the ball object BL from a predetermined movement start position PS to a predetermined movement end position PE in the game space. At this point, when the game player is on offense and the game device is on defense, the mobile object control unit 227 decides a type of pitch and a course of the ball object BL based on a sortition process that is performed according to a sortition probability determined in advance for each type of pitch and each course. In this case, examples of types of pitch include a straight fastball, a curve, and a screwball, and examples of courses include a predetermined position inside the hitting zone SF.

In addition, as the sortition probability that is determined in advance for each type of pitch and each course, a value determined in advance according to an ability value of the pitcher character CL2 or a phase of the game may be adopted.

Furthermore, the mobile object control unit 227 corrects a trajectory of the ball object BL determined in advance for each type of pitch so that the ball object BL reaches a decided course to decide a trajectory of the ball object BL. In addition, the mobile object control unit 227 moves the ball object BL according to the decided trajectory in the game space.

Furthermore, the mobile object control unit 227 outputs a drawing command to the display control unit 229 to have an estimated arrival position YP of the ball object BL in the hitting zone SF set between the movement start position PS and the movement end position PE displayed on the display unit 211 when the pitcher character CL2 performs a windup motion. In addition, the mobile object control unit 227 hides the estimated arrival position YP once the ball object BL reaches the movement end position PE.

In FIG. 6, the estimated arrival position YP is displayed. In this case, for example, a course decided in the hitting zone SF may be adopted as the estimated arrival position YP. Accordingly, the game player can manipulate the aiming cursor K using, as a guide, not only the ball object BL but also a display position of the estimated arrival position YP.

In conventional baseball games, an estimated arrival position YP is displayed immediately after the pitcher character CL2 throws the ball object BL. In the present embodiment, a mode is adopted in which the aiming cursor K is manipulated via the manipulation icon CM instead of directly manipulating the aiming cursor K. Therefore, there is a risk that a game player accustomed to a mode in which the aiming cursor K is directly manipulated may feel that it has become more difficult to position the aiming cursor K on the ball object BL. In consideration thereof, in the present embodiment, the estimated arrival position YP is displayed when the pitcher character CL2 performs a windup motion. Accordingly, since a display time of the estimated arrival position YP is longer than a conventional display time, the game player can assess the estimated arrival position YP in a relaxed manner and the aiming cursor K can be positioned on the ball object BL more easily.

Moreover, as the estimated arrival position YP, an arrival position in the hitting zone SF or a slightly separated position therefrom may be displayed initially, and during movement of the ball object BL, a projected position of the ball object BL onto the hitting zone SF may be displayed. In this case, the estimated arrival position YP moves in accordance with a movement of the ball object BL, which makes it difficult to position the aiming cursor K on the ball object BL compared to a mode where the estimated arrival position YP is stationary and can make the game more interesting.

Returning now to FIG. 2, the character control unit 228 moves various characters in the game space. In the present embodiment, the character control unit 228 moves a character in the game space by moving a three-dimensional model of the character stored in an image data storage unit 241. For example, the character control unit 228 causes the pitcher character CL2 to perform a windup motion and, after the windup, a motion of throwing the ball object BL. In addition, for example, the character control unit 228 causes the batter character CL1 to perform a motion of holding the bat object BT and, subsequently, swinging the bat object BT.

The display control unit 229 generates a two-dimensional rendering image data representing the game space by arranging three-dimensional models of a baseball field, the batter character CL1, the pitcher character CL2, and the like as well as a virtual light source, a virtual camera, and the like in the game space, pasting textures on the three-dimensional models and rendering the three-dimensional models, and displays the two-dimensional rendering image data on the display unit 211. In this case, the display control unit 229 generates the rendering image data at a predetermined frame rate and writes the rendering image data in to a graphic RAM (not shown) at a predetermined frame rate. Accordingly, the batter character CL1, the pitcher character CL2, the ball object BL, and the like are displayed in animation on the display unit 211.

In addition, the display control unit 229 superimposes image data of the aiming cursor K and the manipulation icon CM on the rendering image data according to drawing commands from the aiming cursor display unit 221 and the manipulation icon display unit 222. Accordingly, the aiming cursor K and the manipulation icon CM are displayed on the display unit 211. Furthermore, the display control unit 229 superimposes image data of the estimated arrival position YP on the rendering image data according to a drawing command from the mobile object control unit 227. Accordingly, the estimated arrival position YP is displayed on the display unit 211.

The storage unit 240 includes an image data storage unit 241 and an ability value storage unit 242. The image data storage unit 241 stores various image data including a three-dimensional model and a texture of a baseball field, a three-dimensional model and a texture of player characters, and a three-dimensional model and a texture of the ball object BL.

The ability value storage unit 242 stores an ability value determined in advance for each player character.

Next, an operation of the game device according to the present embodiment will be described. FIG. 3 is a flow chart showing an operation of a game device according to an embodiment of the present invention. This is a flow chart representing a case where the ball object BL is thrown once by the pitcher character CL2. In addition, a case will be described below in which the game player is on offense and the game device is on defense.

First, in step S1, the display control unit 229 arranges three-dimensional models of the batter character CL1, a baseball field, the pitcher character CL2, fielder characters, and the like in the game space, performs texture mapping and the like, and performs initialization. In addition, the display control unit 229 starts a process for periodically generating rendering image data. In this case, for example, an image such as that shown in FIG. 5 is displayed on the manipulation display unit 210.

Next, the mobile object control unit 227 decides a type of pitch and a course by a sortition process, and based on the decided type of pitch and course, decides a trajectory of the ball object BL (step S2).

The character control unit 228 then causes the pitcher character CL2 to perform a windup motion (step S3). The mobile object control unit 227 then starts display of the estimated arrival position YP (step S4). Next, the character control unit 228 causes the pitcher character CL2 to perform a throwing motion and the mobile object control unit 227 starts a movement of the ball object BL in the game space (step S5). Accordingly, the ball object BL is moved along the trajectory decided in step S2.

Next, when a movement command is accepted by the manipulation command accepting unit 223 (YES in step S6), the manipulation icon display unit 222 outputs a drawing command for moving and displaying the manipulation icon CM according to the movement command to the display control unit 229 and causes the manipulation icon CM to be moved and displayed on the display unit 211 (step S7).

The aiming cursor linking control unit 224 then moves and displays the aiming cursor K on the display unit 211 such that the aiming cursor K is linked with the movement of the manipulation icon CM that is being moved and displayed (step S8).

In step S6, when the manipulation command accepting unit 223 does not accept a movement command (NO in step S6), processes of steps S7 and S8 are skipped and a jump is made to step S9.

Next, when the finger YB is separated from the manipulation icon CM and a timing decision command is inputted by the game player (YES in step S9), the action application timing deciding unit 225 advances processing to step S13.

On the other hand, when the finger YB is not separated from the manipulation icon CM and a timing decision command is not inputted by the game player (NO in step S9), the action application timing deciding unit 225 advances processing to step S10.

In step S10, if the ball object BL has not reached the movement end position PE (NO in step S10), the mobile object control unit 227 returns processing to step S6.

In other words, when a timing decision command is not inputted by the game player, the manipulation icon CM is moved and displayed according to the movement command until the ball object BL reaches the movement end position PE, and the aiming cursor K is moved and displayed so as to be linked with the movement and display of the manipulation icon CM. When a timing decision command is then inputted by the game player (YES in step S9), a hitting determination process is executed by the action applying unit 226 (step S13).

Subsequently, when the action applying unit 226 determines that the game player has been able to hit the ball object BL (YES in step S13), the action applying unit 226 performs a process for setting hitting power (step S14) and calculates a direction and a magnitude of the initial velocity V0 of the ball object BL.

Figure 12:
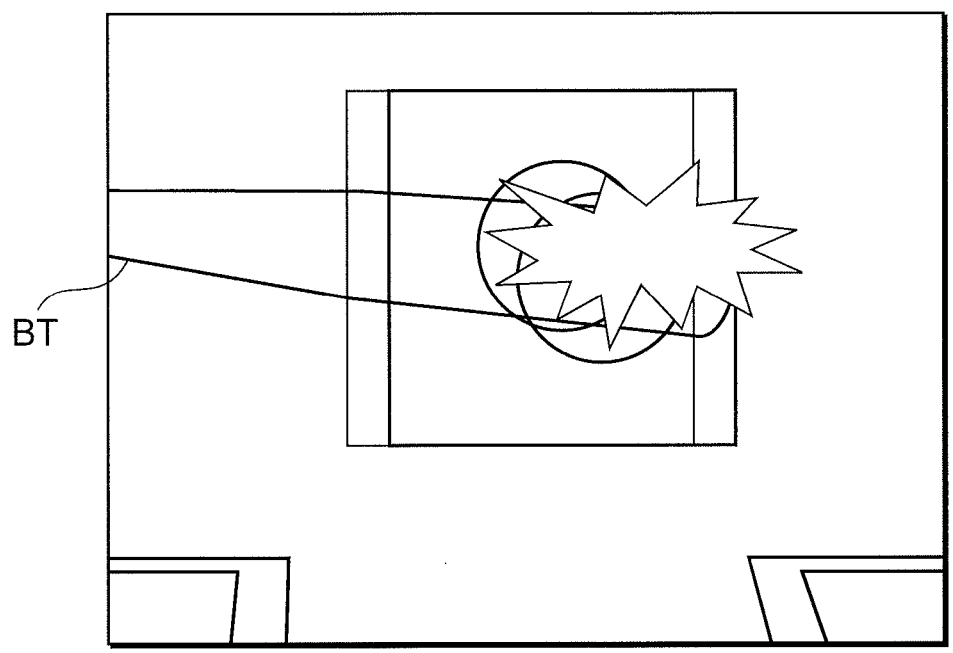
FIG. 12 is an image clearly showing that a ball object has been bit by a bat object.

In this case, as shown in FIG. 12, the action applying unit 226 causes an image that clearly indicates that the ball object BL has been hit by the bat object BT to be displayed on the display unit 211.

Next, the mobile object control unit 227 hides the estimated arrival position YP (step S15), and performs a hitting process for calculating a trajectory of the hit ball object BL (step S16). In this case, the mobile object control unit 227 may calculate a trajectory of the ball object BL by setting a center of gravity of the ball object BL as a mass point and solving an equation of motion of the mass point using the initial velocity V0 of the ball object BL calculated in step S14 in order to repetitively calculate a position of the ball object BL.

On the other hand, when the action applying unit 226 determines that the game player has not been able to hit the ball object BL (NO in step S13) or, in other words, determines that the game player has swung at the ball object BL and missed, the mobile object control unit 227 hides the estimated arrival position YP (step S17).

Next, the character control unit 228 performs a swing-and-miss process by causing the pitcher character CL2 to perform a swing-and-miss motion with the bat object BT and causing the catcher character to perform a catching motion of the ball object BL (step S18).

In step S10, when a timing decision command is not inputted by the game player before the ball object BL reaches the movement end position PE (YES in step S10) or, in other words, when the game player has the batter character CL1 let the ball object BL go by, the mobile object control unit 227 hides the estimated arrival position YP (step S11). Next, the character control unit 228 performs a called strike process for causing the catcher character to catch the ball object BL without having the batter character CL1 swing the bat object BT (step S12).

In this manner, the game proceeds as the processes in the flow chart shown in FIG. 3 are executed each time the pitcher character CL2 throws the ball object BL. Moreover, while a case where the game player is on offense and the game device is on defense has been used as an example for the flow chart shown in FIG. 3, when the game player is on defense and the game device is on offense, the pitcher character CL2 need only throw the ball object BL according to a course and a type of pitch inputted by the game player. In this case, since the game player is on defense, the manipulation icon CM may be hidden.

Figure 4:
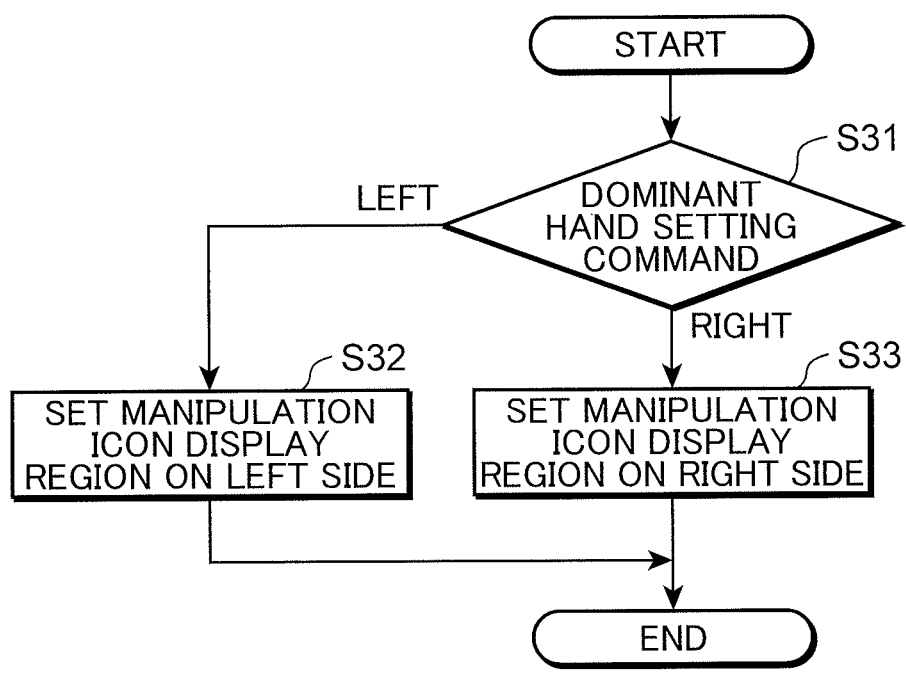
FIG. 4 is a flow chart showing processing by a game device when a dominant hand setting command is inputted by a game player.

Next, processing by the game device when a dominant hand setting command is inputted by the game player will be described. FIG. 4 is a flow chart showing processing by the game device when a dominant hand setting command is inputted by the game player.

First, the manipulation command accepting unit 223 accepts a dominant hand setting command from the game player (step S31). For example, the dominant hand setting command is inputted by the game player according to a dominant hand setting screen displayed on the display unit 211 when the game player starts a game. The dominant hand setting screen is provided with, for example, a "left" button and a "right" button.

Therefore, when the "left" button is touched by the game player, the manipulation command accepting unit 223 determines that a dominant hand setting command for setting the left hand as a dominant hand has been inputted by the game player (left in step S31). In addition, the manipulation icon display unit 222 sets the manipulation icon display region DM2 on the left side of the display unit 211 (step S32). On the other hand, when the "right" button is touched by the game player, the manipulation command accepting unit 223 determines that a dominant hand setting command for setting the right hand as a dominant hand has been inputted by the game player (right in step S31). In addition, the manipulation icon display unit 222 sets the manipulation icon display region DM2 on the right side of the display unit 211 (step S33).

Display of the manipulation icon display region DM2 is allowed to be set on the right side or the left side of the display unit 211 depending on a dominant hand as described above because it is assumed that the game device according to the present embodiment is to be grasped by one hand and manipulations are to be performed by the same grasping hand.

FIGS. 5, 6, and 8 show a case where the device is grasped by the right hand and manipulations are performed by the thumb of the same right hand. Obviously, in this case, the game player is right-handed. In this case, the manipulation icon display region DM2 is also displayed on the right side of the screen as shown in FIG. 6.

Therefore, supposing that a left-handed game player holds this device with the left hand, it is difficult to perform manipulations by extending the left thumb to the opposite right side. In addition, since visibility also declines if the left thumb straddles the screen, it is substantially difficult to grasp the device and perform manipulations at the same time with one hand. In this regard, according to the present configuration, since the manipulation icon display region DM2 can be displayed on the left side, even a left-handed game player can grasp the device and perform manipulations at the same time with one hand.

Moreover, when a dominant hand setting command is not inputted by the game player prior to the start of game, the manipulation icon display unit 222 may set the manipulation icon display region DM2 on the right side of the display unit 211.

While a case of executing a baseball game has been exemplified in the embodiment described above, the present invention is not limited thereto and can be applied to games other than baseball in which a ball is hit back using a racket such as tennis, table tennis, and squash tennis. In such a case, the aiming cursor display region DM1 is provided at a location where the racket hits the ball object BL. In addition, the manipulation icon display region DM2 is provided on the left side or the right side of the aiming cursor display region DM1. Furthermore, the aiming cursor K may be moved by having the game player manipulate the manipulation icon CM displayed in the manipulation icon display region DM2.

In addition, the present invention may also be applied to, for example, a penalty shootout in a soccer match. In this case, a game mode is adopted in which the game player positions the aiming cursor K on the ball object BL and has a goalkeeper character attempt to catch the ball object BL. In this mode, the manipulation icon display region DM2 may be displayed on the left side or the right side of the goalkeeper and the game player may manipulate the aiming cursor K by manipulating the manipulation icon CM.

Furthermore, in the embodiment described above, the ratio RT of the movement velocities of the manipulation icon CM and the aiming cursor K may be configured so as to be variable depending on preferences of the game player. In this case, for example, when a request is made by the game player before the start of a game or during a game, a manipulation screen for setting the ratio RT may be displayed and the ratio RT may be set using the manipulation screen. Subsequently, surface areas of the aiming cursor display region DM1 and the manipulation icon display region DM2 may be modified at the altered ratio RT so that the dead space described earlier is not created.

In addition, while a baseball game has been adopted as a game in the embodiment described above, the present invention is not limited thereto and a game in which the game player attempts to catch a flying object such as a bird, an insect, or dandelion seeds may be adopted instead. In this case, the game player may indirectly manipulate the aiming cursor K using the manipulation icon CM and position the aiming cursor K on the flying object, and detach the finger YB from the manipulation icon CM to catch the flying object. Moreover, in this case, an object simulating a butterfly net for catching an insect or the like may be adopted as the aiming cursor K.

Alternatively, a game in which a flying object such as a bird or an insect is shot down with a rifle is also conceivable. In this case, a rifle may be adopted in place of the bat object BT and the aiming cursor K may represent a point of impact of a bullet fired from the rifle.

In addition, a game is also conceivable in which the aiming cursor K is positioned on a mobile object such as a fighter plane or a ship and a missile is launched. In this case, the game player manipulates the manipulation icon CM to position the aiming cursor K on the mobile object and locks on to the mobile object. Subsequently, as the game player releases the finger YB from the manipulation icon CM, a missile is launched and strikes the locked-on mobile object.

Technical features of the game device described above may be summarized as follows.

(1) A game device according to the present invention is a game device that controls progress of a game in which an action is virtually applied to a mobile object that moves in a game space, wherein the game device includes: a manipulation display unit having a touch screen display unit; an aiming cursor display unit which displays, in an aiming cursor display region of the touch screen display unit, an aiming cursor for determining a position where an action is to be applied to the mobile object in the game space; a manipulation icon display unit which displays, in a manipulation icon display region that is separate from the aiming cursor display region on the touch screen display unit, a manipulation icon for manipulating the aiming cursor, and which moves and displays the manipulation icon in response to a movement of an indicator that is in contact with the manipulation icon; a manipulation command accepting unit which accepts a movement command that is inputted by a movement of the indicator that is in contact with the manipulation icon and a timing decision command that is inputted as the indicator is separated from the touch screen display unit after the contact movement; an aiming cursor linking control unit which moves and displays the aiming cursor on the touch screen display unit such that the aiming cursor is linked with a movement of the manipulation icon that is moved and displayed by the manipulation icon display unit; an action application timing deciding unit that decides an action application timing at which an action is applied to the mobile object based on a timing of acceptance of the timing decision command by the manipulation command accepting unit; and an action applying unit which applies an action to the mobile object when at least a part of the mobile object and a part of the aiming cursor overlap each other at the action application timing decided by the action application timing deciding unit.

According to this configuration, a game player can manipulate an aiming cursor by bringing an indicator into contact with a manipulation icon and manipulating the manipulation icon instead of manipulating the aiming cursor by bringing the indicator directly into contact with the aiming cursor. In addition, the manipulation icon is displayed in a manipulation icon display region that is provided separately from an aiming cursor display region. Therefore, the indicator can be prevented from blocking the view of a mobile object and the game player can accurately position the manipulation icon on the mobile object.

To give an example of a baseball game, in order to move a meet cursor (an aiming cursor) that serves as a guide for hitting a flying ball object (a mobile object), instead of bringing a finger into direct contact with the meet cursor, a manipulation icon displayed in a different region can be moved in order to indirectly move the meet cursor that is linked to the manipulation icon. Therefore, the meet cursor can be prevented from becoming obscured by the game player's finger. As a result, operability when positioning the meet cursor on the ball object is improved.

Moreover, a meet cursor has the following functions. Specifically, in a baseball game, while it is possible to adopt specifications that allow a type of pitch or a trajectory of a ball object thrown by a pitcher character to be varied, it is extremely difficult to hit ever-changing positions of the ball object with a bat. Accordingly, in order to realize a configuration that allows a game player to have fun while batting, a meet cursor is provided as a guide for hitting the ball object with a bat. The game player is able to hit the ball object back by moving the meet cursor so that the meet cursor overlaps a flying ball object and by swinging the bat at a timing where the ball object passes a vicinity above home base. In this case, swinging the bat in a state where the meet cursor does not overlap the ball object results in a swing and miss.

Furthermore, a feature of the present configuration is that after movement on the display unit of an indicator that is in contact with the display unit, a timing decision command is inputted as the indicator is separated from the display unit. To give an example of a baseball game, a swing of the bat is triggered by detaching a finger (the indicator) that is in contact with a game screen (the display unit).

Due to a combination of this feature and the aforementioned feature of enabling the meet cursor to be moved at a different location, the present specification enables a series of batting manipulations to be performed in an extremely smooth and easy manner. As a result, in particular, operability when playing a game on a device such as a smartphone or a tablet device while grasping the device can be significantly improved.

Specifically, a case where a game player plays a baseball game that uses a smartphone as its platform will be described. In this case, it is assumed that the game player plays the game while holding the smartphone in one hand (for example, the right hand). First, the game player overlays a meet cursor on a ball object thrown by a pitcher character. In doing so, as described above, instead of directly coming into contact with the meet cursor on the screen, the game player moves a manipulation icon that is displayed in a region that differs from the meet cursor to move the meet cursor linked with the manipulation icon to an arbitrary position. This can be executed by, for example, moving the manipulation icon using the thumb of the right hand that is grasping the smartphone. Since the ball object gradually approaches the batter (home base), the game player waits for the best moment and releases only the thumb which had been in contact with the game screen when the ball object reaches a vicinity above home base.

As a result, triggered by the release of the thumb, the batter character swings his bat. With a conventional non-portable game device, for example, a meet cursor is moved by manipulating an analog switch on a controller with the left hand and a swing of a bat is executed by pressing a corresponding button on the controller with the right hand. However, in the present configuration, both a movement manipulation of the meet cursor and a hitting manipulation of swinging the bat can be performed by the fingers of a hand grasping the device.

In addition, while it is conceivable that performing manipulations with the fingers of the hand grasping the device may be difficult in a case of a tablet device that is larger than a smartphone (since a wider screen places the fingers out of reach, and the like), even in such cases, a manipulation for hitting or the like does not require the use of both hands as was conventional and can be performed by one hand (for example, grasping the device with the left hand and manipulating with the right hand). As a result, superior operability can be provided.

Furthermore, a swing of a bat is triggered not by pressing a button with a finger as was conventional but, conversely, by releasing the finger. Therefore, particularly with a game device that is grasped by a hand, a vibration or a wobble that accompanies a pressing operation does not occur and the game can be played in a stable state.

(2) Preferably, the aiming cursor linking control unit moves and displays the aiming cursor in the aiming cursor display region by setting a movement velocity of the aiming cursor at a certain ratio against a movement velocity of the manipulation icon, and the ratio is set to a value that causes the aiming cursor to move from its initial position to an end of the aiming cursor display region when the manipulation icon moves from its initial position in the manipulation icon display region to an end of the manipulation icon display region.

According to this configuration, even if sizes of the aiming cursor display region and the manipulation icon display region differ from each other, the game player can move the aiming cursor over the entire aiming cursor display region. For example, if the movement velocities of the aiming cursor and the manipulation icon are set equal despite the aiming cursor display region being larger than the manipulation icon display region, a situation may occur where the manipulation icon reaches an end of the manipulation icon display region even though the aiming cursor has not yet reached an end of the aiming cursor display region. In this case, a dead space is created in the aiming cursor display region in which the aiming cursor cannot be moved and the game player is unable to hit a ball object that has reached the dead space.

In consideration thereof, by setting the movement velocity of the aiming cursor at a certain ratio that satisfies the condition described above against the movement velocity of the manipulation icon, a dead space can be prevented from being created in the aiming cursor display region.

(3) Preferably, when the timing decision command is accepted by the manipulation command accepting unit, the manipulation icon display unit hides the manipulation icon.

If the manipulation icon continues to be displayed after a timing decision command is inputted, the game player may be misled into thinking that the manipulation icon can perhaps be manipulated. In consideration thereof, by adopting a mode in which the manipulation icon is hidden once a timing decision command is inputted, the game player can avoid being misled in such a manner. In addition, by erasing an unnecessary image from the display unit, operability can also be improved.

(4) Preferably, a mobile object control unit which moves the mobile object from a predetermined movement start position to a predetermined movement end position in the game space is further provided, and when the timing decision command is not inputted by a game player before the mobile object reaches the movement end position, the manipulation icon display unit hides the manipulation icon when the mobile object reaches the movement end position.

If the manipulation icon continues to be displayed even after the mobile object has reached the movement end position, the manipulation icon is displayed even if there is no need to manipulate the manipulation icon and may give the game player a feeling of strangeness. In consideration thereof, the manipulation icon is hidden once the mobile object reaches the movement end position to prevent the game player from having such a feeling of strangeness.

(5) Preferably, the game is a baseball game, the mobile object is a ball object that is thrown by a pitcher character which first performs a windup motion and then performs a throwing motion, and the mobile object control unit displays an estimated arrival position of the ball object in a hitting zone set between the movement start position and the movement end position on the touch screen display unit when the pitcher character performs the windup motion and hides the estimated arrival position when the ball object reaches the movement end position.

In conventional baseball games, an estimated arrival position is displayed immediately after a pitcher character throws the ball object. With the present configuration, as described in (1), a mode is adopted in which the aiming cursor is manipulated via the manipulation icon instead of directly manipulating the aiming cursor. Therefore, there is a risk that a game player accustomed to a mode in which the aiming cursor is directly manipulated may feel that it has become more difficult to position the aiming cursor on the ball object. In consideration thereof, with the configuration according to (5), the estimated arrival position is displayed when the pitcher character performs a windup motion. Accordingly, since a display time of the estimated arrival position is longer than a conventional display time, the game player can assess the estimated arrival position in a relaxed manner and the aiming cursor can be positioned on the ball object more easily. Moreover, when the estimated arrival position is first displayed on the screen, the estimated arrival position does not indicate a final arrival position where the ball object passes above home base and appears at a position that is slightly distant from the final arrival position. Subsequently, the position gradually changes with the movement of the ball object, and at the moment where the ball object finally passes above home base, the position becomes consistent with the point of passage. Therefore, the game player attempts to predict a final arrival position by observing a position of appearance of the estimated arrival position and the manner of movement.

(6) Preferably, the manipulation command accepting unit accepts a dominant hand setting manipulation command that is inputted by the game player in order to specify that the game player is left handed or right handed, and the manipulation icon display unit sets the manipulation icon display region at a left end of the touch screen display unit when the game player is left handed and sets the manipulation icon display region at a right end of the touch screen display unit when the game player is right handed.

Since the manipulation icon display region is set to the right end or the left end of the display unit depending on a dominant hand of the game player, the game player can manipulate the manipulation icon using the finger of his/her own dominant hand without straddling the aiming cursor display region. As a result, the trajectory of the ball object can be accurately assessed and operability can be improved. For example, when the dominant hand of the game player is the left hand, if the manipulation icon display region is set to the right end of the display unit, the game player must manipulate the manipulation icon with the left hand so as to straddle the aiming cursor display region and the left hand ends up blocking the view of the mobile object. In consideration thereof, by setting the manipulation icon display region on the left side of the display unit when the dominant hand is the left hand, such problems can be avoided and operability can be improved.

(7) Preferably, the manipulation icon is a circle whose surface area is greater by a predetermined size than a surface area of a region in which the indicator and the touch screen display unit come into contact with each other.

According to this configuration, the size of the manipulation icon is set slightly larger than the surface area of the region in which the indicator and the display unit come into contact with each other. Therefore, the indicator is prevented from blocking the view of the manipulation icon and operability can be improved. In addition, by giving the manipulation icon a circular shape, the indicator can be readily brought into contact with the manipulation icon from any direction.

The invention claimed is:
1. A mobile gaming device configured to control progress of a video game in which an action is virtually applied to a virtual mobile object that moves in a virtual game space, the mobile device comprising:
  a single display device configured to display the virtual game space and comprising a touchscreen; and
  a memory device storing thereon computer-executable instructions for the video game;
  a processor, which upon executing the computer-executable instructions, is configured to:
    accept a dominant hand setting, the dominant hand setting received by input from a game player, via the touchscreen, specifying that the game player is left-handed or right-handed;
    display, on the display device, in an aiming cursors display region, an aiming cursor configured to determine a position where the action is to be applied to the virtual mobile object in the virtual game space;
    display, on the display device, a manipulation icon display region entirely at (i) a left-end of the virtual game space when the dominant hand setting specifies that the game player is left-handed, or (ii) a right-end of the virtual game space when the dominant hand setting specifies that the game player is right-handed, the manipulation icon display region being separate from the aiming cursors display region;
    display a manipulation icon, in the manipulation icon display region, configured to manipulate the aiming cursor, the manipulation icon moveable within the manipulation icon display region in response to a movement of an input received via the touchscreen;
    accept a movement command by detecting contact, via the touch screen, between the game player and the manipulation icon;
    accept a timing decision command based on a first timing when the game player released the contact of the manipulation icon after the movement of the manipulation icon is initiated by the game player, via the touchscreen;

move and display the aiming cursor, on the display device, such that the aiming cursor is linked with the movement of the manipulation icon by the first timing;

decide an action application timing at which the action is applied to the virtual mobile object based on a second timing of acceptance of the timing decision command; and apply the action to the virtual mobile object in the virtual game space when at least a portion of the virtual mobile object and a portion of the aiming cursor overlap each other at the action application timing based on the movement of the manipulation icon.

2. The mobile game device according to claim 1, wherein the processor, which upon executing the computer-executable instructions, is further configured to:

move and display the aiming cursor, on the display device, in the aiming cursor display region by setting a movement velocity of the aiming cursor at a predetermined ratio against a movement velocity of the manipulation icon, the predetermined ratio being set to a value that causes the aiming cursor to move from an initial position to an end of the aiming cursor display region when the manipulation icon moves from an initial position in the manipulation icon display region to an end of the manipulation icon display region.

3. The mobile game device according to claim 1, wherein when the timing decision command is accepted, the manipulation icon is hidden.

4. The mobile game device according to claim 1, wherein the processor, which upon executing the computer-executable instructions, is further configured to:

move the virtual mobile object from a predetermined movement start position to a predetermined movement end position in the virtual game space; and when the timing decision command is not inputted by the game player before the virtual mobile object reaches the movement end position, hide the manipulation icon when the mobile object reaches the movement end position.

5. The mobile game device of claim 4, wherein
the video game is a baseball video game,
the mobile object is a ball object that is thrown by a pitcher character which first performs a windup motion and then performs a throwing motion, and
the processor, which upon executing the computer-executable instructions, is further configured to display an estimated arrival position of the ball object in a hitting zone set between the movement start position and the movement end position, on the display device, when the pitcher character performs the windup motion, and hide the estimated arrival position when the ball object reaches the movement end position.

6. The mobile game device according to claim 1, wherein the manipulation icon is a circle whose surface area is greater by a predetermined size than a surface area of a region in which the dominant hand of the game player and the display device come into contact with each other.

7. A non-transitory computer-readable storage medium having stored thereon computer-readable instructions to control progress of a video game in which an action is virtually applied to a virtual mobile object that moves in a virtual game space, the video game playable on a mobile game device having a single display device comprising a touchscreen, the computer-readable instructions, when executed by a processor, cause the processor to:

accept a dominant hand setting, the dominant hand setting received by input from a game player, via the touchscreen, specifying that the game player is left-handed or right-handed;

display, on the display device, in an aiming cursors display region, an aiming cursor configured to determine a position where the action is to be applied to the virtual mobile object in the virtual game space;

display, on the display device, a manipulation icon display region entirely at (i) a left-end of the virtual game space when the dominant hand setting specifies that the game player is left-handed, or (ii) a right-end of the virtual game space when the dominant hand setting specifies that the game player is right-handed, the manipulation icon display region being separate from the aiming cursors display region;

display a manipulation icon, in the manipulation icon display region, configured to manipulate the aiming cursor, the manipulation icon moveable within the manipulation icon display region in response to a movement of an input received via the touchscreen;

accept a movement command by detecting contact, via the touch screen, between the game player and the manipulation icon;

accept a timing decision command based on a first timing when the game player released the contact of the manipulation icon after the movement of the manipulation icon is initiated by the game player, via the touchscreen;

move and display the aiming cursor, on the display device, such that the aiming cursor is linked with the movement of the manipulation icon by the first timing;

decide an action application timing at which the action is applied to the virtual mobile object based on a second timing of acceptance of the timing decision command; and apply the action to the virtual mobile object in the virtual game space when at least a portion of the virtual mobile object and a portion of the aiming cursor overlap each other at the action application timing based on the movement of the manipulation icon.

* * * * *